United States Patent
Koizumi

(10) Patent No.: US 10,846,771 B2
(45) Date of Patent: Nov. 24, 2020

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Isao Koizumi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 16/013,740

(22) Filed: Jun. 20, 2018

(65) Prior Publication Data

US 2018/0300784 A1 Oct. 18, 2018

Related U.S. Application Data

(63) Continuation of application No. PCT/JP2016/083469, filed on Nov. 11, 2016.

(30) Foreign Application Priority Data

Feb. 3, 2016 (JP) ................................ 2016-019223

(51) Int. Cl.
*G06Q 30/00* (2012.01)
*G06Q 30/06* (2012.01)
(Continued)

(52) U.S. Cl.
CPC ....... *G06Q 30/0621* (2013.01); *G06F 3/0482* (2013.01); *G06F 13/00* (2013.01);
(Continued)

(58) Field of Classification Search
CPC ..................................... G06Q 30/0601–0645
(Continued)

(56) References Cited

U.S. PATENT DOCUMENTS

| 6,915,273 B1* | 7/2005 | Parulski ............. G06Q 30/0601 705/26.5 |
| 2003/0117651 A1* | 6/2003 | Matraszek ............. G06F 16/58 358/1.18 |

(Continued)

FOREIGN PATENT DOCUMENTS

| JP | 2001-297051 A | 10/2001 |
| JP | 2006-011649 A | 1/2006 |

(Continued)

OTHER PUBLICATIONS

Surf 'n' print 10-pack; A free way to print from the information highway. (May 14, 1996). Business Wire Retrieved from https://dialog.proquest.com/professional/docview/1052670065?accountid=131444.*

(Continued)

*Primary Examiner* — Resha Desai
(74) *Attorney, Agent, or Firm* — Studebaker & Brackett PC

(57) ABSTRACT

In the image processing apparatus, the image processing method, the program, and the recording medium, a product item acquisition section acquires a first image product item set by a first user, and a number-of-images range acquisition section acquires a number-of-used-images range of images to be used in the first image product item. An upload prompting section transmits prompt information prompting the upload of images. Then, an image acquisition section acquires images from terminal devices of a plurality of users, and a number-of-images calculation section calculates the number of images after a predetermined period has passed. In a case where the number of images is out of the number-of-used-images range, a product item proposing section proposes an alternative different from the first image product item according to the number of images.

18 Claims, 23 Drawing Sheets

(51) Int. Cl.
   *G06Q 50/10*      (2012.01)
   *G06F 13/00*      (2006.01)
   *G06Q 10/10*      (2012.01)
   *G06F 3/0482*     (2013.01)

(52) U.S. Cl.
   CPC ....... *G06Q 10/101* (2013.01); *G06Q 30/0643* (2013.01); *G06Q 50/10* (2013.01)

(58) Field of Classification Search
   USPC .............................................. 705/26.1–27.2
   See application file for complete search history.

(56) References Cited

U.S. PATENT DOCUMENTS

| | | | | |
|---|---|---|---|---|
| 2008/0046327 | A1* | 2/2008 | Schnietz | G06Q 30/00 705/26.5 |
| 2012/0054072 | A1* | 3/2012 | McCurdy | G06Q 10/10 705/27.1 |
| 2012/0321187 | A1* | 12/2012 | Yamaji | H04N 1/00137 382/173 |
| 2013/0004073 | A1* | 1/2013 | Yamaji | G06T 11/60 382/173 |
| 2014/0079322 | A1* | 3/2014 | Yamaji | G06F 16/58 382/209 |
| 2015/0092070 | A1 | 4/2015 | Hatano et al. | |

FOREIGN PATENT DOCUMENTS

| | | |
|---|---|---|
| JP | 2008-257308 A | 10/2008 |
| JP | 2010-237967 A | 10/2010 |
| JP | 2011-075994 A | 4/2011 |
| JP | 2013-030161 A | 2/2013 |
| JP | 2013-033453 A | 2/2013 |
| JP | 2015-022747 A | 2/2015 |
| JP | 2015-069431 A | 4/2015 |
| JP | 2015-133000 A | 7/2015 |

OTHER PUBLICATIONS

An Office Action mailed by the Japanese Patent Office dated Dec. 3, 2019, which corresponds to Japanese Patent Application No. 2016-019223 and is related to U.S. Appl. No. 16/013,740.

An Office Action mailed by the Japanese Patent Office dated Apr. 23, 2019, which corresponds to Japanese Patent Application No. 2016-019223 and is related to U.S. Appl. No. 16/013,740.

International Search Report issued in PCT/JP2016/083469; dated Feb. 7, 2017.

International Preliminary Report on Patentability issued in PCT/JP2016/083469; dated Feb. 13, 2018.

\* cited by examiner

<     3. CHECK/SAVE CONTENTS

STEP1 STEP2 STEP3> STEP4

2/3   LOG IN AND SAVE INPUT CONTENTS SO FAR.

E-MAIL ADDRESS

PASSWORD

LOGIN

NEW MEMBERSHIP REGISTRATION    PASSWORD FORGOT

FIG. 20

<     3. CHECK/SAVE CONTENTS

STEP1 STEP2 STEP3> STEP4

3/3   LOGIN AND SAVING OF INPUT CONTENTS HAVE BEEN COMPLETED.

E-MAIL OF COMPLETION OF REGISTRATION HAS BEEN SENT TO REGISTERED E-MAIL ADDRESS OF MEMBER ***.
THIS E-MAIL INCLUDES URL FOR ACCESSING MANAGEMENT SCREEN FOR SECRETARY. IN ORDER TO START, PLEASE CLICK THIS URL.
* IF YOU WANT TO SEND E-MAIL OF COMPLETION OF REGISTRATION TO E-MAIL ADDRESS OTHER THAN E-MAIL ADDRESS OF MEMBER ***:
E-MAIL ADDRESS [ ]

SEND

NEXT

FIG. 21

<     4. CREATE/SEND INVITATION LETTER

STEP1 STEP2 STEP3 STEP4

1/3   PLEASE INPUT MESSAGE OF INVITATION LETTER TO BE SENT TO EVERYONE.

MESSAGE OF INVITATION LETTER

> LET'S MAKE PHOTOBOOK WITH YOUR PHOTOS AND MESSAGES!

NUMBER OF CHARACTERS: 25/150

[ NEXT ]

FIG. 22

<     4. CREATE/SEND INVITATION LETTER

STEP1 STEP2 STEP3 STEP4

2/3   THIS IS PREVIEW OF INVITATION LETTER TO BE SENT TO EVERYONE. IF YOU WANT TO CHANGE MESSAGE, PLEASE RETURN TO PREVIOUS SCREEN TO INPUT.

MESSAGE FROM SECRETARY
LET'S MAKE PHOTOBOOK WITH YOUR PHOTOS AND MESSAGES!

HOPEFULLY

* PROVIDE PHOTOS TO BE USED IN PHOTOBOOK

* WRITE MESSAGE FOR PHOTOBOOK

[ TO INVITATION LETTER SENDING SCREEN ]

FIG. 23

| < | 4. CREATE/SEND INVITATION LETTER |
|---|---|

| | STEP1 STEP2 STEP3 :STEP4 |
|---|---|
| 3/3 | PLEASE SEND INVITATION LETTER AND PASSWORD TO EVERYONE BY SNS OR E-MAIL. |

SEND INVITATION LETTER

| SNS | E-MAIL |

INVITATION LETTER URL http://XXXXXXX

PASSWORD

5865

NEXT

IMAGE PROCESSING APPARATUS, IMAGE PROCESSING METHOD, PROGRAM, AND RECORDING MEDIUM

CROSS REFERENCE TO RELATED APPLICATIONS

This application is a Continuation of PCT International Application No. PCT/JP2016/083469 filed on Nov. 11, 2016, which claims priority under 35 U.S.C. § 119(a) to Patent Application No. 2016-019223 filed in Japan on Feb. 3, 2016, all of which are hereby expressly incorporated by reference into the present application.

BACKGROUND OF THE INVENTION

1. Field of the Invention

The present invention relates to an image processing apparatus, an image processing method, a program, and a non-transitory computer-readable recording medium for creating a composite image, such as a photobook, using a plurality of images acquired from terminal devices of a plurality of users through a network.

2. Description of the Related Art

A photobook is a service to create a photo collection of a layout that a user desires using a plurality of transmitted images (image data) in a case where the user transmits the plurality of images to the service provider through the Internet.

For example, a photobook is created by classifying a plurality of images into a plurality of groups based on the imaging time or the like in consideration of the continuity or relevance of images and automatically arranging (automatically laying out) images included in each group on corresponding pages.

In recent years, not only creating one photobook using a plurality of images owned by one user but also creating one photobook using a plurality of images owned by a plurality of users (refer to JP2008-257308A and JP2015-069431A), acquiring messages for writing from a plurality of users and creating a writing using the messages for writing acquired from the plurality of users (refer to JP2001-297051A and JP2015-133000A), and the like are known.

SUMMARY OF THE INVENTION

In a case where one user creates a composite image, the user usually knows what type of image the user desires to create as a target image product item. The user can select the type of desired image product item based on the number of target images. On the other hand, in the case of creating a composite image by acquiring a plurality of images from terminal devices of a plurality of users, it is not possible to know the number of images in advance. Therefore, a creator who creates a composite image by acquiring a plurality of users' images predicts the number of images to be acquired in the future and selects an image product item based on the predicted number of images.

In a case where the number of actually acquired images is larger than the predicted number, the number of images to be used exceeds the number of arrangement regions of images of selected image product items. Accordingly, the acquired image can not be used effectively. In a case where the number of actually acquired images is less than the predicted number, an empty region may be generated in an image arrangement region in a composite image. Accordingly, the appearance may worsen, and a composite image may not be able to be created.

Thus, in the case of creating a composite image by acquiring a plurality of images from terminal devices of a plurality of users, it is not possible to know the number of images in advance. Therefore, it is difficult to create a composite image using an appropriate image product item corresponding to the number of images.

It is an object of the present invention to provide an image processing apparatus, an image processing method, a program, and a non-transitory computer-readable recording medium capable of proposing an appropriate image product item according to the number of images acquired from terminal devices of a plurality of users.

In order to achieve the aforementioned object, the present invention provides an image processing apparatus comprising: a product item acquisition section that acquires a first image product item set by at least one first user of a plurality of users, among one or more image product items, from a terminal device of the first user through a network; a number-of-images range acquisition section that acquires a number-of-used-images range of images to be used in the first image product item; an upload prompting section that transmits first prompt information prompting upload of the images to terminal devices of the plurality of users through the network; an image acquisition section that acquires a first image group, which is uploaded from the terminal devices of the plurality of users, through the network for a first predetermined period after the first prompt information is transmitted; a number-of-images calculation section that calculates the number of images in the first image group after the first predetermined period has passed; and a product item proposing section that transmits proposal information, which is for proposing an alternative different from the first image product item, to the terminal device of the first user through the network according to the number of images in the first image group in a case where the number of images in the first image group is out of the number-of-used-images range.

Here, it is preferable that, in a case where the number of images in the first image group exceeds an upper limit of the number-of-used-images range and an image product item using a larger number of images than the first image product item is included in the one or more image product items, the product item proposing section transmits proposal information, which is for proposing the image product item using a larger number of images than the first image product item, as the different alternative.

It is preferable that, in a case where the number of images in the first image group exceeds an upper limit of the number-of-used-images range and an image product item having a larger number of pages than the first image product item is included in the one or more image product items, the product item proposing section transmits proposal information, which is for proposing the image product item having a larger number of pages than the first image product item, as the different alternative.

It is preferable that, in a case where the number of images in the first image group is less than a lower limit of the number-of-used-images range and an image product item using a smaller number of images than the first image product item is included in the one or more image product items, the product item proposing section transmits proposal information, which is for proposing the image product item using a smaller number of images than the first image product item, as the different alternative.

It is preferable that, in a case where the number of images in the first image group is less than a lower limit of the number-of-used-images range and an image product item having a smaller number of pages than the first image product item is included in the one or more image product items, the product item proposing section transmits proposal information, which is for proposing the image product item having a smaller number of pages than the first image product item, as the different alternative.

It is preferable that, in a case where the number of images in the first image group is less than a lower limit of the number-of-used-images range, the product item proposing section transmits proposal information, which is for proposing giving up use of the first image product item, as the different alternative.

It is preferable to further comprise a trimming section that trims the first image group to create a processed image in a case where the number of images in the first image group is less than a lower limit of the number-of-used-images range. It is preferable that the number-of-images calculation section calculates the first total number of images by adding up the number of images in the first image group and the number of processed images after the first predetermined period has passed. It is preferable that, in a case where the first total number of images is less than the lower limit and an image product item using a smaller number of images than the first image product item is included in the one or more image product items, the product item proposing section transmits proposal information, which is for proposing the image product item using a smaller number of images than the first image product item, as the different alternative.

It is preferable to further comprise a trimming section that trims the first image group to create a processed image in a case where the number of images in the first image group is less than a lower limit of the number-of-used-images range. It is preferable that the number-of-images calculation section calculates the first total number of images by adding up the number of images in the first image group and the number of processed images after the first predetermined period has passed. It is preferable that, in a case where the first total number of images is less than the lower limit and an image product item having a smaller number of pages than the first image product item is included in the one or more image product items, the product item proposing section transmits proposal information, which is for proposing the image product item having a smaller number of pages than the first image product item, as the different alternative.

It is preferable to further comprise a trimming section that trims the first image group to create a processed image in a case where the number of images in the first image group is less than a lower limit of the number-of-used-images range. It is preferable that the number-of-images calculation section calculates the first total number of images by adding up the number of images in the first image group and the number of processed images after the first predetermined period has passed. It is preferable that, in a case where the first total number of images is less than the lower limit, the product item proposing section transmits proposal information, which is for proposing giving up use of the first image product item, as the different alternative.

It is preferable that, in a case where the number of images in the first image group is less than the lower limit, the upload prompting section transmits second prompt information prompting upload of the images to the terminal devices of the plurality of users.

It is preferable that the image acquisition section acquires a second image group, which is uploaded from the terminal devices of the plurality of users, for a second predetermined period after the second prompt information is transmitted, and the number-of-images calculation section calculates the second total number of images by adding up the number of images in the first image group and the number of images in the second image group after the second predetermined period has passed. It is preferable that, in a case where the second total number of images is less than the lower limit and an image product item using a smaller number of images than the first image product item is included in the one or more image product items, the product item proposing section transmits proposal information, which is for proposing the image product item using a smaller number of images than the first image product item, as the different alternative.

It is preferable that the image acquisition section acquires a second image group, which is uploaded from the terminal devices of the plurality of users, for a second predetermined period after the second prompt information is transmitted and that the number-of-images calculation section calculates the second total number of images by adding up the number of images in the first image group and the number of images in the second image group after the second predetermined period has passed. It is preferable that, in a case where the second total number of images is less than the lower limit and an image product item having a smaller number of pages than the first image product item is included in the one or more image product items, the product item proposing section transmits proposal information, which is for proposing the image product item having a smaller number of pages than the first image product item, as the different alternative.

It is preferable that the image acquisition section acquires a second image group, which is uploaded from the terminal devices of the plurality of users, for a second predetermined period after the second prompt information is transmitted and that the number-of-images calculation section calculates the second total number of images by adding up the number of images in the first image group and the number of images in the second image group after the second predetermined period has passed. It is preferable that, in a case where the second total number of images is less than the lower limit, the product item proposing section transmits proposal information, which is for proposing giving up use of the first image product item, as the different alternative.

It is preferable that the upload prompting section transmits the first prompt information to the terminal device of the first user, acquires a transmission instruction, which is for transmitting the first prompt information to terminal devices of users other than the first user, from the terminal device of the first user, and transmits the first prompt information to the terminal devices of the users other than the first user in response to the transmission instruction.

It is preferable that the upload prompting section transmits the first prompt information to the terminal devices of the plurality of users by using an application for sending and receiving an e-mail or a message.

It is preferable that the number-of-images range acquisition section acquires the number-of-used-images range according to at least one of a size or the number of pages of the first image product item.

It is preferable that the one or more image product items include a plurality of types of image product items of which at least sizes or numbers of pages are different.

In addition, the present invention provides an image processing method comprising: a step in which a product item acquisition section acquires a first image product item set by at least one first user of a plurality of users, among one or more image product items, from a terminal device of the first user through a network; a step in which a number-of-images range acquisition section acquires a number-of-used-images range of images to be used in the first image product item; a step in which an upload prompting section transmits first prompt information prompting upload of the images to terminal devices of the plurality of users through the network; a step in which an image acquisition section acquires a first image group, which is uploaded from the terminal devices of the plurality of users, through the network for a first predetermined period after the first prompt information is transmitted; a step in which a number-of-images calculation section calculates the number of images in the first image group after the first predetermined period has passed; and a step in which a product item proposing section transmits proposal information, which is for proposing an alternative different from the first image product item, to the terminal device of the first user through the network according to the number of images in the first image group in a case where the number of images in the first image group is out of the number-of-used-images range.

In addition, the invention provides a program causing a computer to execute each step of the image processing method described above.

In addition, the invention provides a non-transitory computer-readable recording medium in which a program causing a computer to execute each step of the image processing method described above is recorded.

In the present invention, in a case where the number of images is out of the number-of-used-images range acquired by the number-of-images range acquisition section, the product item proposing section proposes an alternative different from the image product item acquired by the product item acquisition section according to the number of images. Therefore, in the case of creating a composite image by acquiring a plurality of images from the terminal devices of a plurality of participating users, it is possible to use an appropriate image product item even though the user does not know the number of images in advance.

BRIEF DESCRIPTION OF THE DRAWINGS

FIG. 18 is a conceptual diagram of an example showing a screen for checking the information of image product items and a schedule.

FIG. 19 is a conceptual diagram of an example showing a screen for inputting account information.

FIG. 20 is a conceptual diagram of an example showing a screen showing that the login of a secretary user and the storage of the information of image product items and the schedule have been completed.

FIG. 21 is a conceptual diagram of an example showing a screen for creating an invitation letter to be sent to the terminal device of the participating user.

FIG. 22 is a conceptual diagram of an example showing a screen for checking the contents of the invitation letter.

FIG. 23 is a conceptual diagram of an example showing a screen for sending an invitation letter to the terminal device of the participating user.

FIG. 25 is a conceptual diagram of an example showing a screen for inputting a common password for accessing a screen onto which participating users uploads images used in a composite image, evaluation information of images, messages for writing, and the like.

DESCRIPTION OF THE PREFERRED EMBODIMENTS

Hereinafter, an image processing apparatus, an image processing method, a program, and a recording medium of the present invention will be described in detail based on a preferred embodiment shown in the accompanying diagrams.

Figure 1:
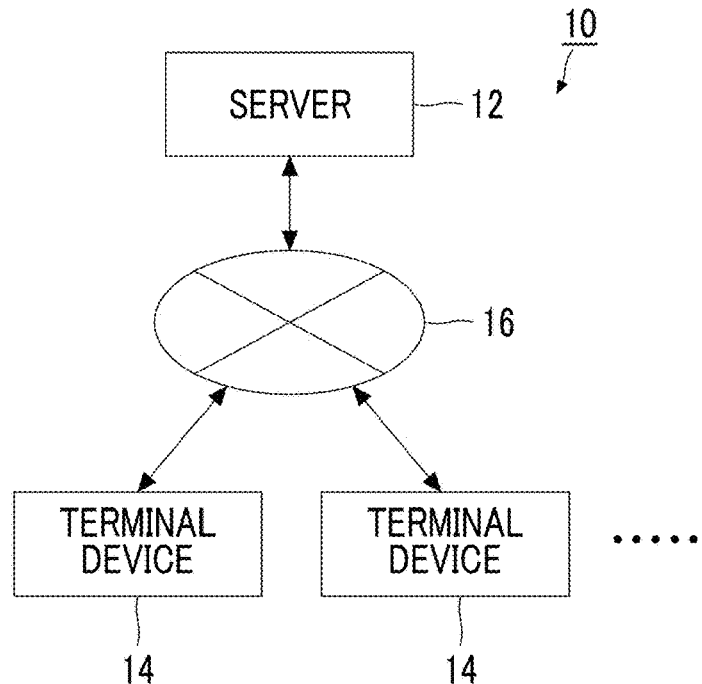
FIG. 1 is a block diagram of an embodiment showing the configuration of an image processing apparatus according to the present invention.

FIG. 1 is a block diagram of an embodiment showing the configuration of the image processing apparatus according to the present invention. An image processing apparatus 10 shown in FIG. 1 creates a composite image, such as a photobook including a writing page, using a plurality of images acquired from terminal devices of a plurality of users involved in the creation of a composite image through a network 16. The image processing apparatus 10 includes a server 12 and terminal devices (clients) 14 of a plurality of users connected to the server 12 through the network 16.

The server 12 performs various kinds of data processing for creating a composite image in response to an instruction from the terminal device 14, and is configured by, for example, a desktop personal computer (PC) or a workstation.

The terminal device 14 gives various instructions to the server 12 to perform various kinds of data processing, and is configured by, for example, a smartphone, a tablet PC, or a notebook PC.

The network 16 is, for example, a telephone line or the Internet circuit, and connects the server 12 and the terminal device 14 to each other by wired or wireless connection to enable bidirectional communication.

Figure 2:
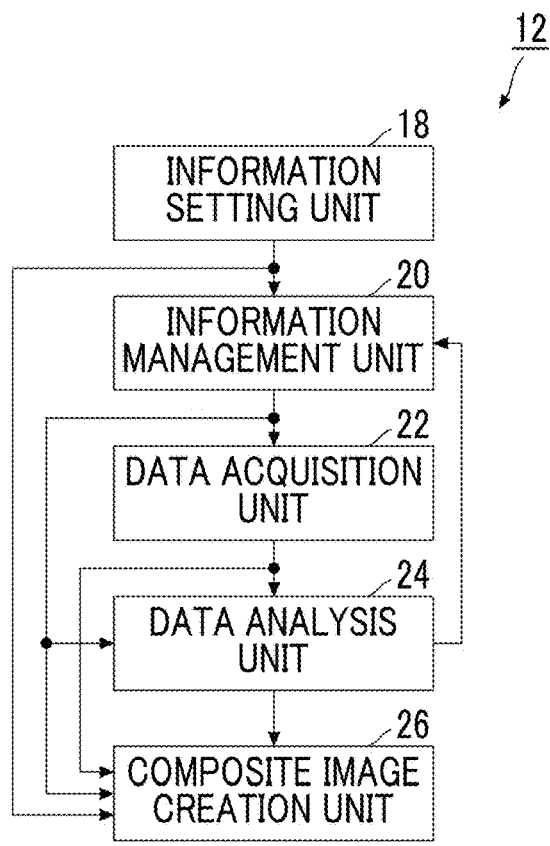
FIG. 2 is a block diagram of an embodiment showing the configuration of a server shown in FIG. 1.

FIG. 2 is a block diagram of an embodiment showing the configuration of the server shown in FIG. 1. The server 12 shown in FIG. 2 includes an information setting unit 18 for setting various kinds of information regarding a composite image, an information management unit 20 for managing various kinds of information regarding the creation of a composite image, a data acquisition unit 22 for acquiring various kinds of data used in a composite image, a data analysis unit 24 for analyzing various kinds of data used in a composite image, and a composite image creation unit 26 for creating a composite image.

In the following explanation, among a plurality of users involved in the creation of a composite image including a main page and a writing page, one user who creates a composite image is expressed as a secretary user, and two or more users including the secretary user are expressed as participating users. For example, a case where a secretary is one of a group of friends corresponds to this.

However, in another embodiment, in a case where the secretary himself or herself provides neither photos nor messages, such as a case where a photo shop undertakes an agency as a secretary, it is assumed that the number of secretary users does not include the number of participating users.

Figure 3:
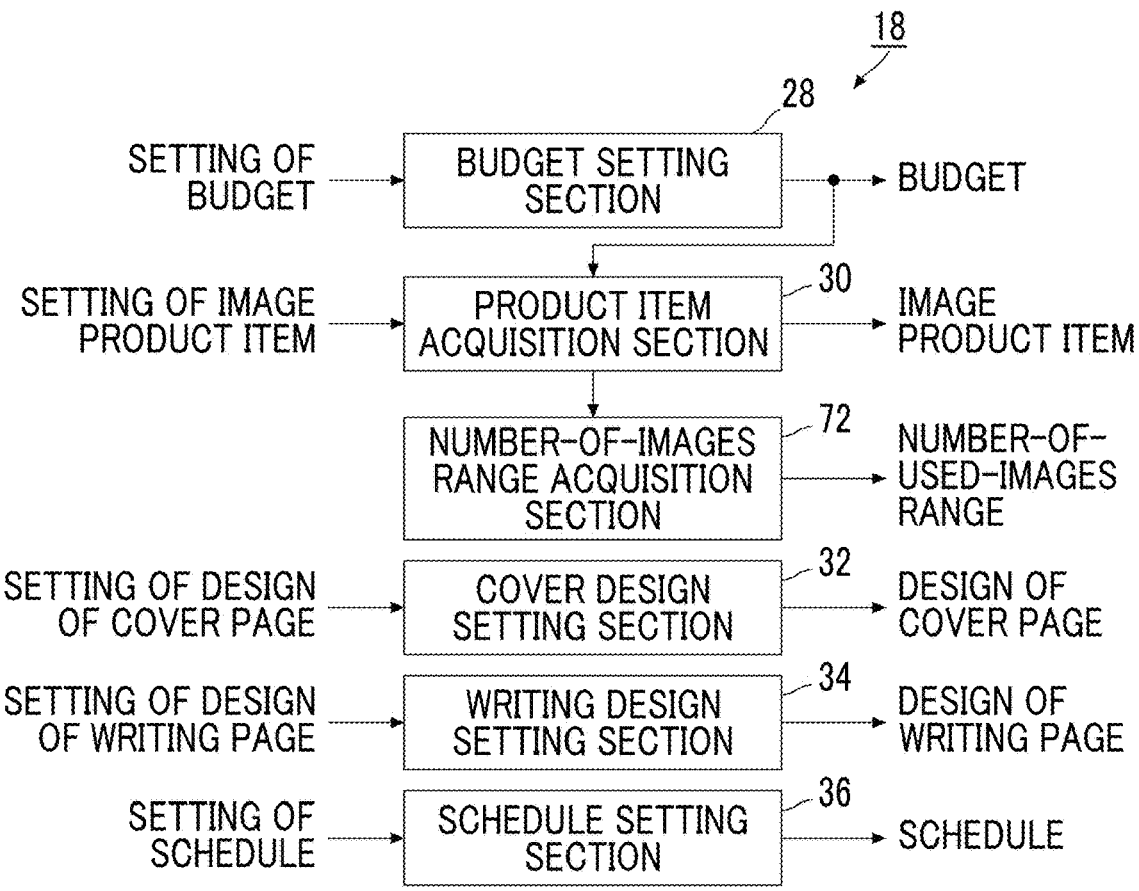
FIG. 3 is a block diagram of an embodiment showing the configuration of an information setting unit shown in FIG. 2.

FIG. 3 is a block diagram showing the configuration of an embodiment showing the configuration of the information setting unit shown in FIG. 2. The information setting unit 18 shown in FIG. 3 includes a budget setting section 28, a product item acquisition section 30, a number-of-images range acquisition section 72, a cover design setting section 32, a writing design setting section 34, and a schedule setting section 36. For example, a control device, such as one or a plurality of central processing units (CPUs), executes a program loaded onto a memory, thereby realizing the functions of the respective sections in the information setting unit 18.

The budget setting section 28 acquires information regarding a budget for a composite image, which is set by the secretary user, from the terminal device 14 of the secretary user through the network 16.

Then, the product item acquisition section 30 acquires one image product item set by the secretary user, among one or more image product items (information of one or more image product items) with a size and the number of pages corresponding to the information of the budget acquired by the budget setting section 28, from the terminal device 14 of the secretary user through the network 16.

The image product item is an item for creating an image product, and includes, for example, a photo album such as a photobook, a shuffle print, a calendar with an image, and the like. Images are mainly photos.

In addition, image product items include a plurality of types of image product items having at least different sizes or different numbers of pages. The number of pages of the image product item is the number of pages including a main page and a writing page. An image product includes an image product of a paper medium and an image product of electronic data.

A page referred to in the present invention means a unit for performing images arrangement and writings arrangement. In the present embodiment, a page refers to a two-page spread page. However, in other embodiments, a page may be a single-sided page. In addition, a two-page spread page may be set as a unit in the image processing apparatus of the present embodiment, and the number of pages of the image product item may be displayed for the user with the single-sided page as a unit.

The photobook is, for example, a composite image obtained by arranging a plurality of images selected by the user on a plurality of pages in a layout that the user desires. In addition, the photobook may be a composite image obtained by arranging images, which are automatically selected from images in a desired period (for example, one year) that are held by the user, on a plurality of pages in an automatic layout (for example, an ear album manufactured by FUJIFILM Co., Ltd.). In addition, the shuffle print is a composite image obtained by arranging a plurality of images on one print by shuffling the plurality of images. The calendar with an image is a composite image obtained by arranging images corresponding to the calendar of each month, for example.

In the case of the present embodiment, a composite image is a photobook that includes a writing page at the end of the book. The writing page is a composite image in which messages for writing of two or more participating users acquired from the terminal devices 14 of the participating users are arranged. The message for writing is a message of each participating user used in the message for writing.

In addition to the message for writing, a profile image may be placed on the writing page. Although the profile image is, for example, a face image of each participating user, other images may be used.

Then, the number-of-images range acquisition section 72 acquires the number-of-used-images range of images to be used in the image product item acquired by the product item acquisition section 30, that is, the lower limit number of images and the upper limit number of images to be used in the image product item.

The number-of-images range acquisition section 72 acquires the number-of-used-images range of images according to the type of the image product item. For example, it is possible to acquire the number-of-used-images range of images according to at least one of the size of the image product item or the number of pages.

Then, the cover design setting section 32 acquires information regarding the design of one cover page set by the secretary user, among the design of one or more cover pages, from the terminal device 14 of the secretary user through the network 16.

The information of the design of the cover page includes, for example, not only design information, such as a cover page pattern and illustrations drawn on the cover page, but also information of the title of a composite image described on the cover page, information of the color of the cover page, and the like.

Then, the writing design setting section 34 acquires information regarding the design of one writing page set by the secretary user, among the design of one or more writing pages, from the terminal device 14 of the secretary user through the network 16.

The information of the design of the writing page includes, for example, information of a template in which positions, sizes, and the like for arranging the profile image and message for writing of each participating user on the writing page are set in advance.

Then, the schedule setting section 36 acquires schedule information, which includes the deadline for images and messages for writing set by the secretary user, a composite image creation period, and the delivery date of an image product, from the terminal device 14 of the secretary user through the network 16.

The deadline for images and messages for writing indicates a time limit by which each participating user can upload (submit) images and messages for writing, that is, a time limit by which the image processing apparatus 10 can acquire images and messages for writing from the terminal device 14 of the participating user.

In addition, the composite image creation period indicates a period during which the secretary user creates a composite image using a plurality of images acquired from the terminal devices 14 of a plurality of users, in other words, a time limit by which an image product can be ordered. The delivery date of an image product indicates a date to deliver the image product.

Figure 4:
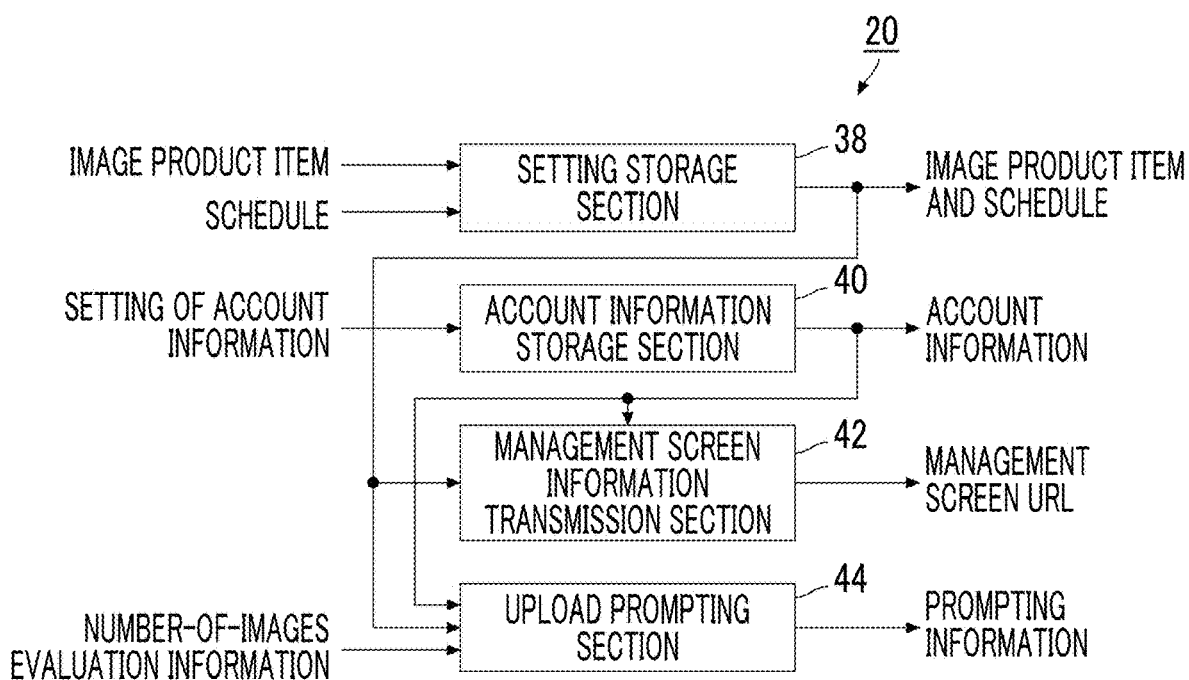
FIG. 4 is a block diagram of an embodiment showing the configuration of an information management unit shown in FIG. 2.

Next, FIG. 4 is a block diagram of an embodiment showing the configuration of the information management unit shown in FIG. 2. The information management unit 20 shown in FIG. 4 includes a setting storage section 38, an account information storage section 40, a management screen information transmission section 42, and an upload prompting section 44. For example, a control device, such as one or a plurality of central processing units (CPUs), executes a program loaded onto a memory, thereby realizing the functions of the respective sections in the upload prompting section 44.

The setting storage section 38 stores the information of the image product item acquired by the product item acquisition section 30 and the schedule acquired by the schedule setting section 36.

Then, the account information storage section 40 acquires secretary user account information set by the secretary user from the terminal device 14 of the secretary user through the network 16. In addition, the account information storage section 40 acquires participating user account information set by the participating user from the terminal device 14 of the participating user through the network 16, and stores the participating user account information.

Figures 27, 28:
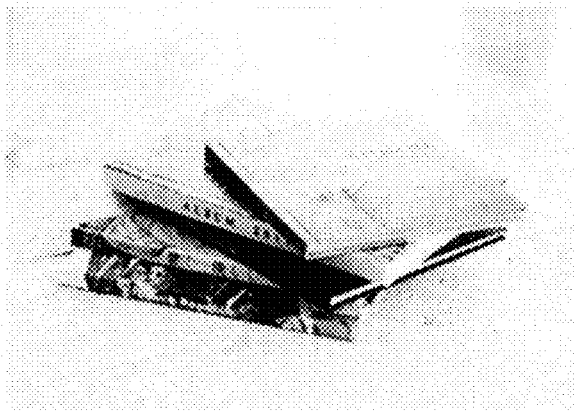
FIG. 27 is a conceptual diagram of an example showing a screen for registering a name registered as a participating user and a secret code.
FIG. 28 is a conceptual diagram of an example showing a screen for a participating user to select an image to be uploaded.

For example, the secretary user account information is the e-mail address of the secretary user and the secretary password. On the other hand, the participating user account information is the name and individual password of the participating user (for the participating user, displayed as a "secret code" as shown in FIG. 27). The name of the participating user is used by the participating user to manage secretary users, and the individual password is used by the image processing apparatus 10 to specify a participating user. In the case of the present embodiment, it is assumed that the secret code cannot be changed and reissued later.

Then, the management screen information transmission section 42 transmits a message, which includes a uniform resource locator (URL) required in a case where the secretary user accesses a management screen for managing an image product item, a schedule, and the like, to the terminal device 14 of the secretary user through the network 16. The secretary user can make changes to secretary users, addition of a secretary user (for example, addition of a deputy secretary described later), and the like in addition to changing the image product item and schedule from the management screen.

For example, the management screen information transmission section 42 transmits a message including a URL for accessing the management screen, to the e-mail address of the secretary user acquired by the account information storage section 40, by e-mail.

Then, the upload prompting section 44 sends an invitation letter created by the secretary user to the terminal device 14 of the participating user through the network 16.

The invitation letter is for inviting participating users to create a composite image, and is prompt information to prompt the participating users to upload images to be used in a composite image, evaluation information for each image, a profile image, a message for writing, and the like.

The upload prompting section 44 sends the invitation letter to the terminal device 14 of each participating user through a message of social networking service (SNS) or by e-mail, for example.

Figure 5:
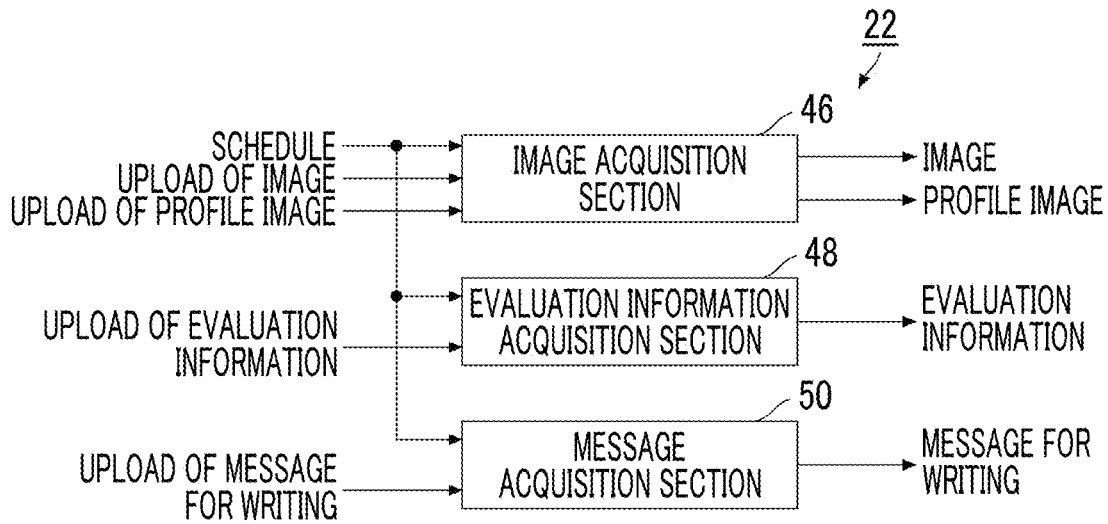
FIG. 5 is a block diagram of an embodiment showing the configuration of a data acquisition unit shown in FIG. 2.

Next, FIG. 5 is a block diagram of an embodiment showing the configuration of the data acquisition unit shown in FIG. 2. The data acquisition unit 22 shown in FIG. 5 includes an image acquisition section 46, an evaluation information acquisition section 48, and a message acquisition section 50.

The image acquisition section 46 acquires a plurality of images (image group) transmitted through the network 16 from the terminal devices 14 of two or more participating users for a predetermined period, in the case of the present embodiment, a period until the deadline for images and messages for writing set by the schedule setting section 36 after the invitation letter is sent. In addition, the image acquisition section 46 acquires the profile image of each participating user set by the participating user.

Then, the evaluation information acquisition section 48 acquires evaluation information indicating evaluation for each image given by two or more participating users, through the network 16, from the terminal device 14 of each of the two or more participating users for the same predetermined period.

The evaluation information of an image is information indicating the evaluation of each participating user for each image, for example, high evaluation or low evaluation.

Then, the message acquisition section 50 acquires the message for writing uploaded by each participating user from the terminal device 14 of each participating user through the network 16 for the same predetermined period.

Figure 6:
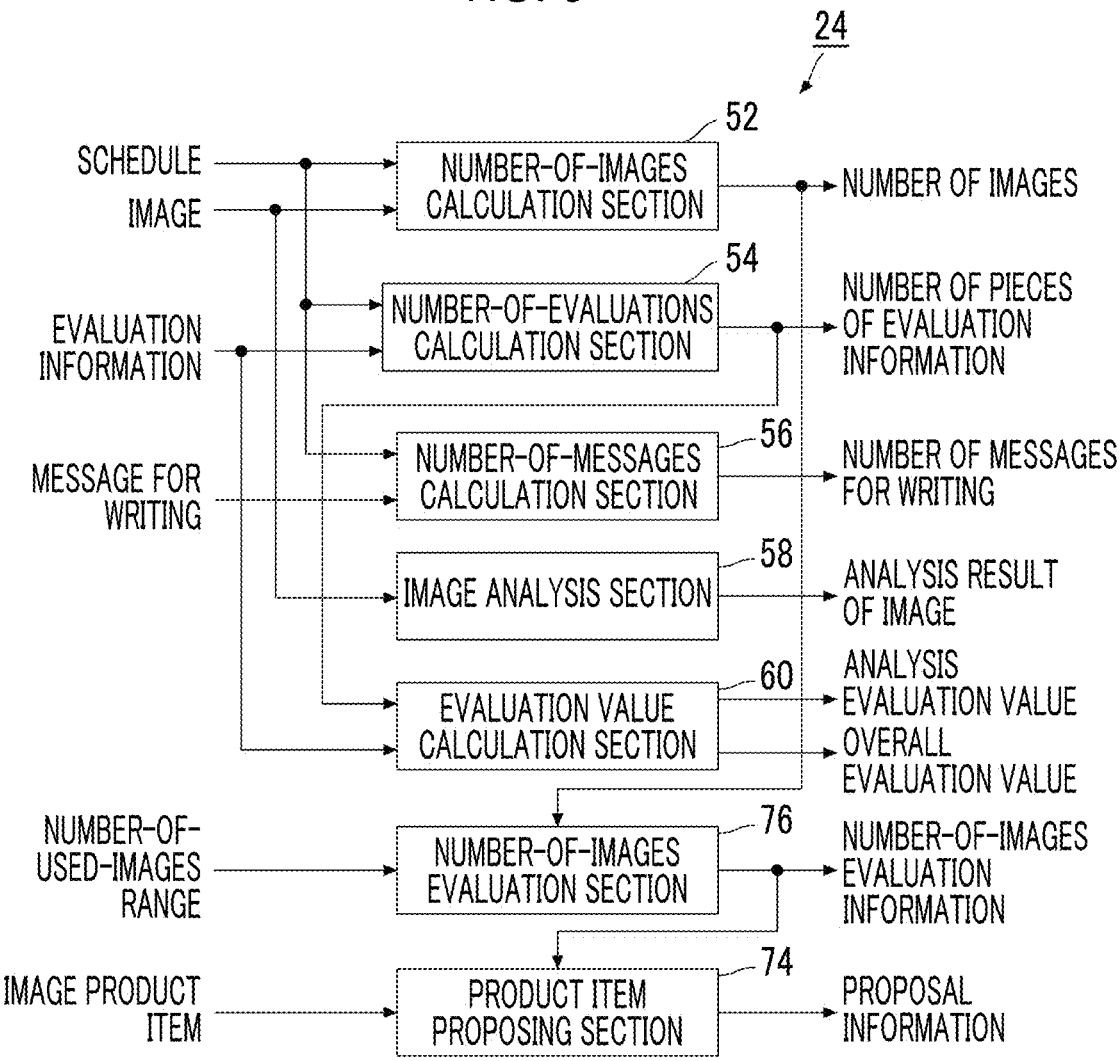
FIG. 6 is a block diagram of an embodiment showing the configuration of a data analysis unit shown in FIG. 2.

Next, FIG. 6 is a block diagram of an embodiment showing the configuration of the data analysis unit shown in FIG. 2. The data analysis unit 24 shown in FIG. 6 includes a number-of-images calculation section 52, a number-of-evaluations calculation section 54, a number-of-messages calculation section 56, an image analysis section 58, an evaluation value calculation section 60, and a product item proposing section 74. For example, a control device, such as one or a plurality of central processing units (CPUs), executes a program loaded onto a memory, thereby realizing the functions of the respective sections in the data analysis unit 24.

The number-of-images calculation section 52 calculates the number of images acquired by the image acquisition section 46 after a predetermined period has passed since the invitation letter was sent by the upload prompting section 44, that is, after the deadline for images and messages for writing has passed.

Then, the number-of-evaluations calculation section 54 calculates the number of pieces of evaluation information indicating the level of the evaluation (high evaluation and low evaluation) of users, which has been acquired by the evaluation information acquisition section 48, after the deadline for images and messages for writing has passed.

Then, the number-of-messages calculation section 56 calculates the number of messages for writing acquired by the message acquisition section 50 after the deadline for images and messages for writing has similarly passed.

Then, the image analysis section 58 analyzes the contents of each image acquired by the image acquisition section 46. In the case of the present embodiment, the image analysis section 58 performs image analysis every time an image is acquired by the image acquisition section 46.

For example, the image analysis section 58 analyzes the brightness or hue of an image, the degree of blurring, and the like. In addition, in a case where a person's face is included in the image, the image analysis section 58 analyzes the size of the face, position of the face, direction of the face, skin color of the face, facial expression such as a smiling face, eye line, the number of persons included in the image, positional relationship of persons, and the like.

Then, the evaluation value calculation section 60 calculates the analysis evaluation value of each image based on the analysis result of each image by the image analysis section 58. In addition, based on the evaluation information indicating high evaluation and low evaluation for each image acquired by the evaluation information acquisition section 48, the evaluation value calculation section 60 calculates an overall evaluation value of each image by adding or subtracting a value to or from the analysis evaluation value of each image or by giving a weighting to the analysis evaluation value of each image.

The evaluation value calculation section 60 can calculate an overall evaluation value of each image, for example, by adding a value to the analysis evaluation value of each image based on the number of pieces of evaluation information indicating high evaluation, which has been calculated by the number-of-evaluations calculation section 54, and subtracting a value from the analysis evaluation value of each image based on the number of pieces of evaluation information indicating low evaluation.

Since the analysis evaluation value of each image is calculated based on the analysis result of the image, the analysis evaluation value of the image is a reference for determining whether or not the image is good or poor. Accordingly, it can be said that the higher the analysis evaluation value, the higher the image quality.

Since the overall evaluation value of an image is calculated based not only on the analysis result of the image but also on evaluation information indicating high evaluation and low evaluation that is given by the participating user, the overall evaluation value of the image is a reference for determining the preference of the participating user in addition to the good or bad of the image. Accordingly, it can be said that the higher the overall evaluation value, the higher the image quality or the more favorite image of the participating user.

Then, in a case where the number of images calculated by the number-of-images calculation section 52 is out of the number-of-used-images range acquired by the number-of-images range acquisition section 72, the product item proposing section 74 transmits proposal information proposing an alternative different from the image product item acquired by the product item acquisition section 30, through the network 16, to the terminal device 14 of the secretary user according to the number of images calculated by the number-of-images calculation section 52.

In the proposal information, the contents of the alternative are determined according to the number of images acquired by the image acquisition section 46 and the type of the image product item acquired by the product item acquisition section 30. As means for transmitting the proposal information, a message of SNS, e-mail, and the like are used.

Then, a number-of-images evaluation section 76 evaluates whether or not the number of images calculated by the number-of-images calculation section 52 is out of the number-of-used-images range acquired by the number-of-images range acquisition section 72, and outputs number-of-images evaluation information that is the evaluation result.

Figure 7:
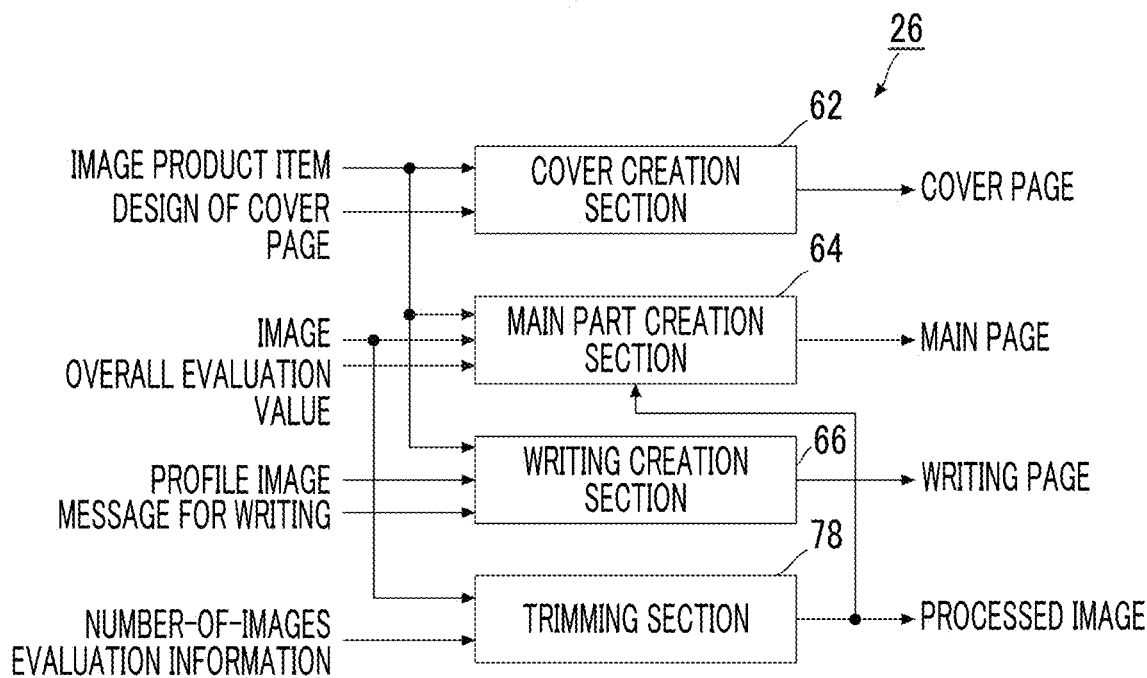
FIG. 7 is a block diagram of an embodiment showing the configuration of a composite image creation unit shown in FIG. 2.

Next, FIG. 7 is a block diagram of an embodiment showing the configuration of the composite image creation unit shown in FIG. 2. The composite image creation unit 26 shown in FIG. 7 includes a cover creation section 62, a main part creation section 64, a writing creation section 66, and a trimming section 78.

The cover creation section 62 creates a cover page of the design corresponding to the information of the product item stored in the setting storage section 38 and the information of the design of the cover page acquired by the cover design setting section 32.

Then, the main part creation section 64 creates main pages of the number of pages (pages other than the cover page and the writing page) corresponding to the information of the product item stored in the setting storage section 38 using a plurality of images acquired by the image acquisition section 46. The main part creation section 64 creates a composite image corresponding to the information of the product item stored in the setting storage section 38, in the case of the present embodiment, the main page of the photobook.

Although not shown, the main part creation section 64 includes an image division section, an image extraction section, an image arrangement section, and the like.

The image division section divides a plurality of images acquired by the image acquisition section 46 into groups the number of which corresponds to the number of main pages.

The image extraction section extracts, for each group of images, a plurality of compositing target images used in main pages, among images included in the group, based on the overall evaluation value of each image.

The image arrangement section determines the size of each compositing target image extracted by the image extraction section and the arrangement position in the main page, based on the overall evaluation value of each image, for each group of images, and arranges (automatically lays out) the compositing target images on the main pages of pages corresponding to the group of images.

Then, the writing creation section 66 creates a writing page using a message for writing and a profile image of each participating user that have been acquired by the message acquisition section 50. The writing creation section 66 creates a writing page of the design corresponding to the information of the product item stored in the setting storage section 38 and the information of the design of the writing acquired by the writing design setting section 34.

Although not shown, the writing creation section 66 includes a message division section, a message arrangement section, and the like.

The message division section divides messages for writing acquired by the message acquisition section 50 into groups the number of which corresponds to the number of writing pages.

For each group of messages for writing, the message arrangement section arranges a message for writing included in the group on the writing page of the page corresponding to the group of messages for writing.

The number of writing pages is set according to the number of participating users, the number of messages for writing, and the like. In addition, the number of main pages is set according to the number of pages of a composite image, the number of writing pages, and the like. In the case of the present embodiment, it is assumed that a 16-page photobook is created by setting the number of participating users to 2 to 36 persons and arranging 2 to 12 messages for writing on the writing page of one page.

In a case where the number of images calculated by the number-of-images calculation section 52 is less than the lower limit of the number-of-used-images range acquired by the number-of-images range acquisition section 72, the trimming section 78 trims the image acquired by the image acquisition section 46 to create a processed image.

Each section that forms the information setting unit 18, the information management unit 20, the data acquisition unit 22, the data analysis unit 24, and the composite image creation unit 26 is realized, for example, by causing a control device, such as one or a plurality of central processing units (CPUs), to execute a program loaded onto the memory. The data stored in each section is stored in a storage device, such as a hard disk drive (HDD), a solid state drive (SSD), and a secure digital (SD) memory, for example.

Figure 8:
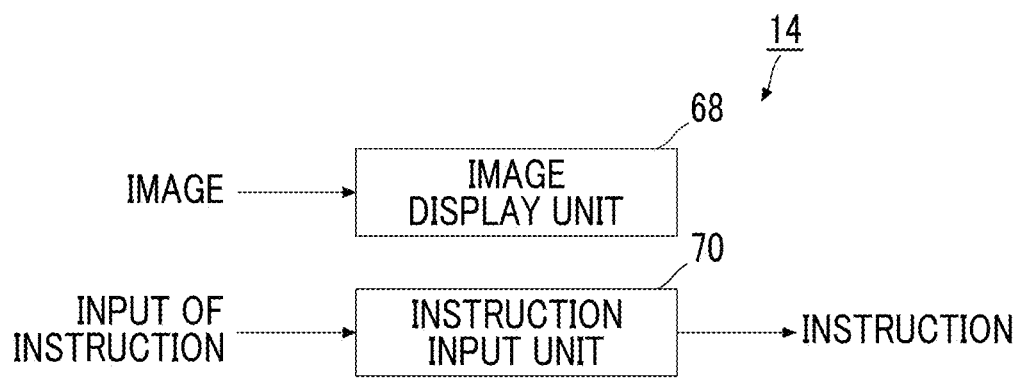
FIG. 8 is a block diagram of an embodiment showing the configuration of a terminal device of a user shown in FIG. 1.

Next, FIG. 8 is a block diagram of an embodiment showing the configuration of the terminal device of each user shown in FIG. 1. The terminal device 14 of each user shown in FIG. 8 includes an image display unit 68 and an instruction input unit 70.

In the terminal device 14, the image display unit 68 displays various setting screens, selection screens, check screens, input screens, creation screens, and the like, and is formed by a display device, such as a liquid crystal display, for example.

Then, the instruction input unit 70 acquires various setting instructions, selection instructions, check instructions, input instructions, creation instructions, and the like input by the user, and is formed by input devices, such as a keyboard and a mouse.

In the case of the present embodiment, the image display unit 68 and the instruction input unit 70 are formed by a device in which a display device and an input device are integrated, such as a touch panel.

The number of terminal devices 14 corresponding to each user involved in the creation of a composite image does not necessarily to be one, and a plurality of terminal devices 14 may correspond to each user as long as the terminal devices 14 can correspond to the account of each user in the image processing apparatus 10.

Although not shown, each of the server 12 and the terminal device 14 includes, for example, a transmission and reception unit, which is a communication device for transmitting and receiving various kinds of data between the server 12 and the terminal device 14, and a control unit, which is a CPU for controlling the operation of each unit.

Figure 9:
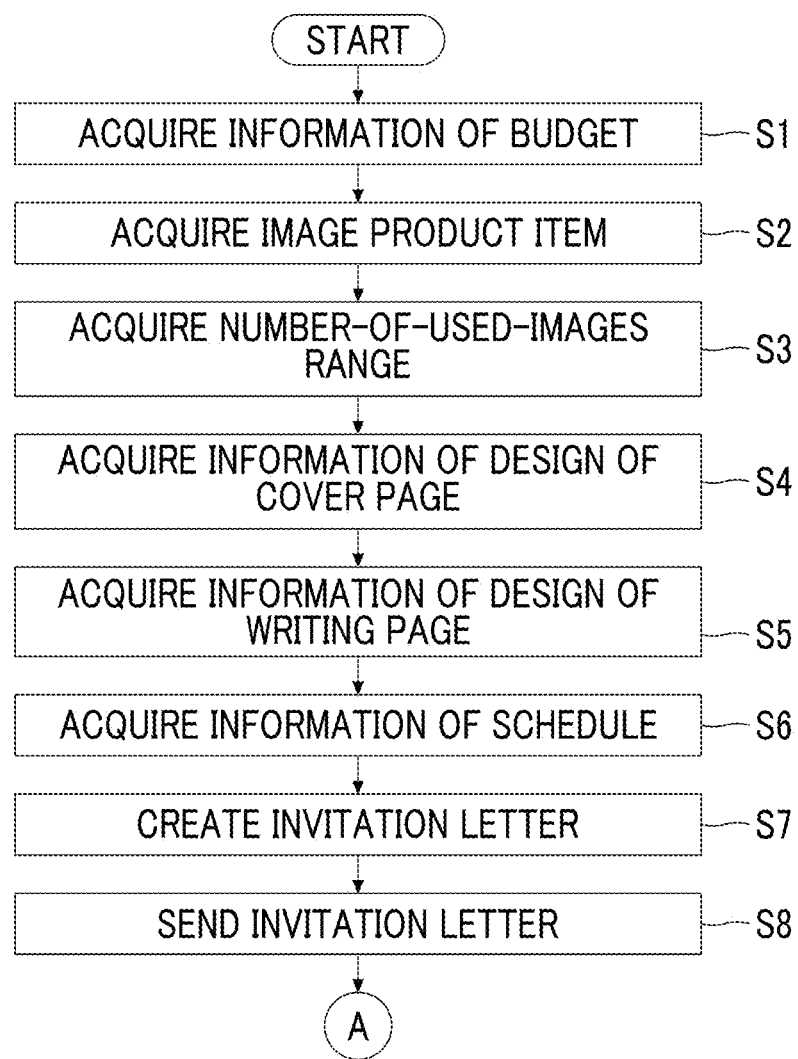
FIG. 9 is a flowchart of an embodiment showing the operation of the image processing apparatus shown in FIG. 1.
Figure 10:
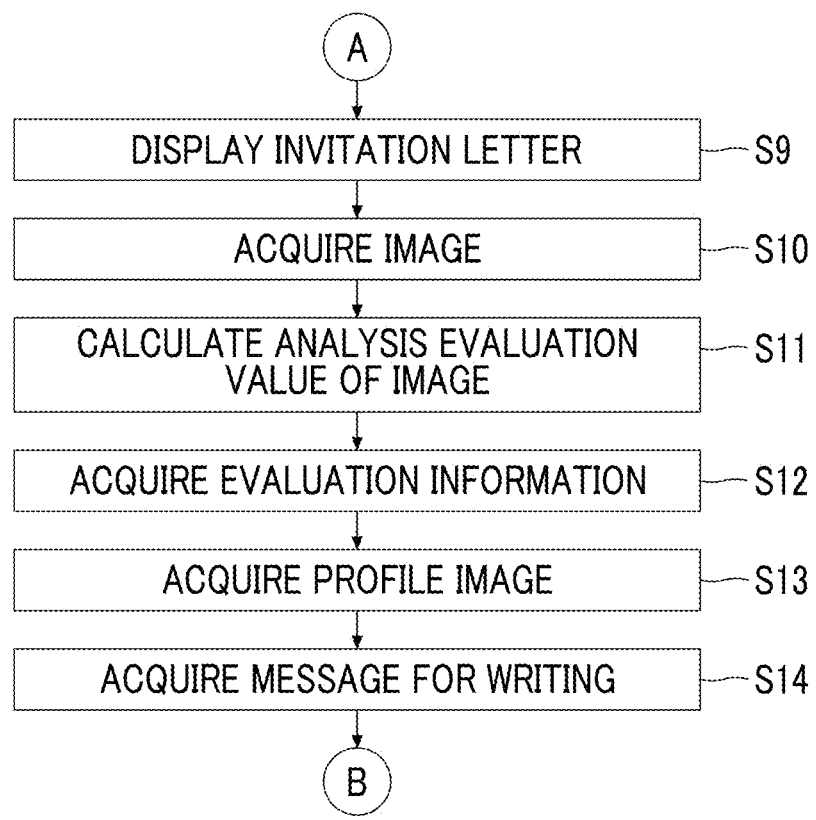
FIG. 10 is a flowchart of an embodiment showing the operation of the image processing apparatus subsequent to FIG. 9.
Figure 11:
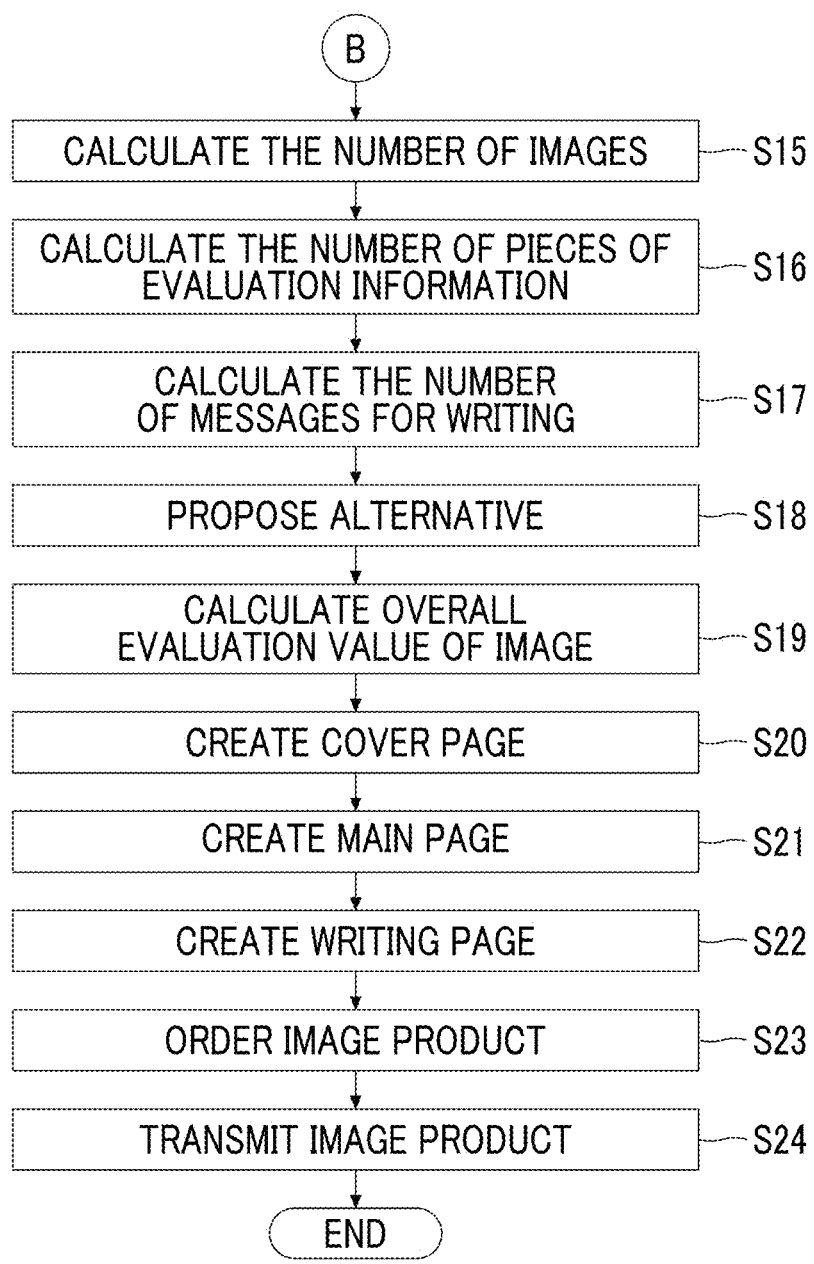
FIG. 11 is a flowchart of an embodiment showing the operation of the image processing apparatus subsequent to FIG. 10.

Next, the operation of the image processing apparatus 10 will be described with reference to flowcharts shown in FIGS. 9 to 11 and a display screen shown in FIGS. 12 to 34.

In the case of creating a composite image, first, a secretary user accesses a website for creating a composite image, which is provided by the image processing apparatus 10, through the instruction input unit 70 in the terminal device 14 of the secretary user.

Figure 12:
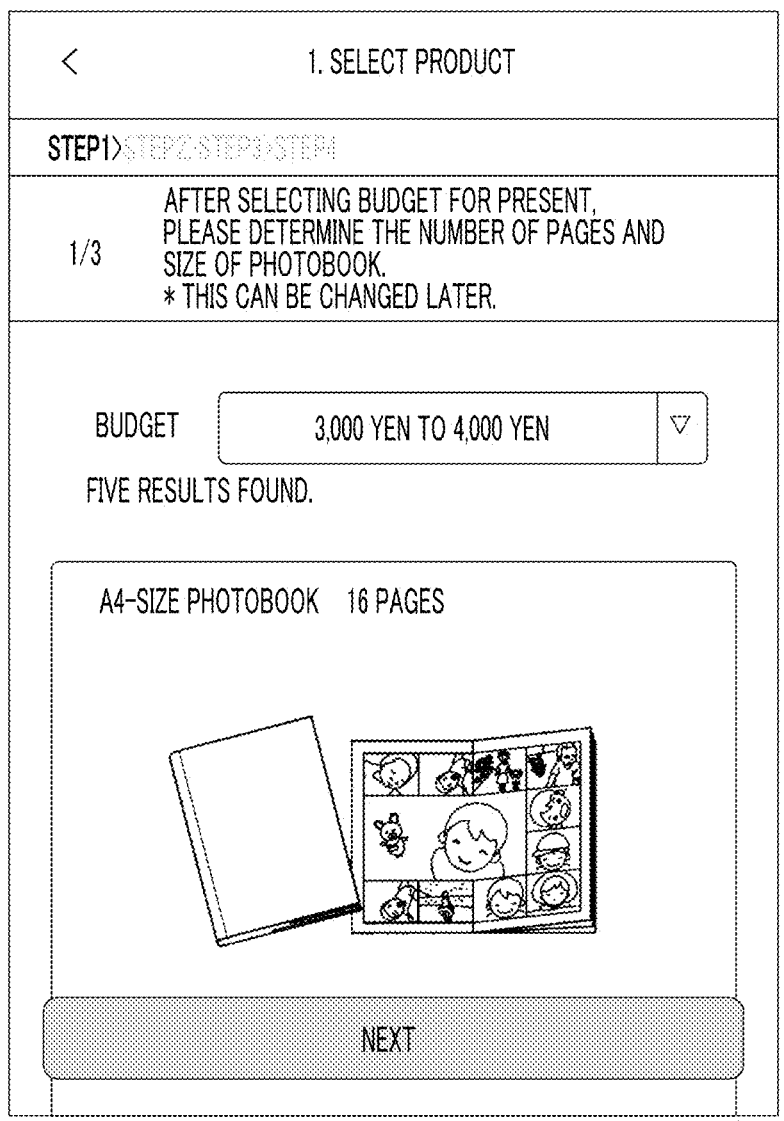
FIG. 12 is a conceptual diagram of an example showing a screen for setting a budget for a composite image.

In a case where the secretary user accesses the website for creating a composite image, as shown in FIG. 12, a screen for setting a budget for the composite image is displayed on the image display unit 68 of the terminal device 14 of the secretary user by the budget setting section 28.

The secretary user sets a budget for the composite image to be created by the secretary user, through the instruction input unit 70, on the screen for setting the budget for the composite image. In the example shown in FIG. 12, a list of budgets for the composite image is registered in advance by the pull-down menu. The secretary user selects and sets one budget, for example, 3000 yen to 4000 yen, from the list of budgets for the composite image registered in the pull-down menu.

In a case where the budget for the composite image is set, the information of the budget for the composite image set by the secretary user is acquired from the terminal device 14 of the secretary user by the budget setting section 28 (step S1).

Then, one or more image product items corresponding to the information of the budget is presented by the product item acquisition section 30. In the example shown in FIG. 12, five photobooks having different sizes and numbers of pages are presented as image product items.

In a case where the image product items are presented, a screen for setting one image product item among the one or more presented image product items is displayed on the image display unit 68 of the terminal device 14 of the secretary user by the product item acquisition section 30.

The secretary user selects and sets one image product item, among the one or more presented image product items, through the instruction input unit 70 on the screen for setting an image product item. In the example shown in FIG. 12, a 16-page photobook of A4 size is set.

After a photobook is set as an image product item, in a case where a "Next" button is pressed, for example, in a case where the "Next" button is tapped or clicked, one image product item set by the secretary user is acquired by the product item acquisition section 30 (step S2).

In addition, in a case where a "<" button is pressed, it is possible to return to the previous screen. The same is true for subsequent screens.

Once the image product item is acquired, the number-of-images range acquisition section 72 sets the number-of-used-images range of images to be used in the image product item (step S3).

Figure 13:
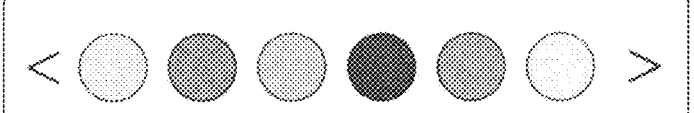
FIG. 13 is a conceptual diagram of an example showing a screen for setting the design of the cover page of a photobook.

Then, as shown in FIG. 13, a screen for setting the design of the cover page of the photobook is displayed on the image display unit 68 of the terminal device 14 of the secretary user by the cover design setting section 32.

On the screen for setting the design of the cover page, the secretary user selects and sets the design of one cover page among the designs of one or more cover pages, in the example shown in FIG. 13, designs of three cover pages, through the instruction input unit 70. As the information of the design of the cover page of the photobook, for example, the secretary user can set the title of the photobook up to 20 characters to be described on the cover page and the color of the cover page.

After the design of the cover page is set, in a case where the "Next" button is pressed, the information of the design of the cover page set by the secretary user is acquired from the terminal device 14 of the secretary user by the cover design setting section 32 (step S4).

Figure 14:
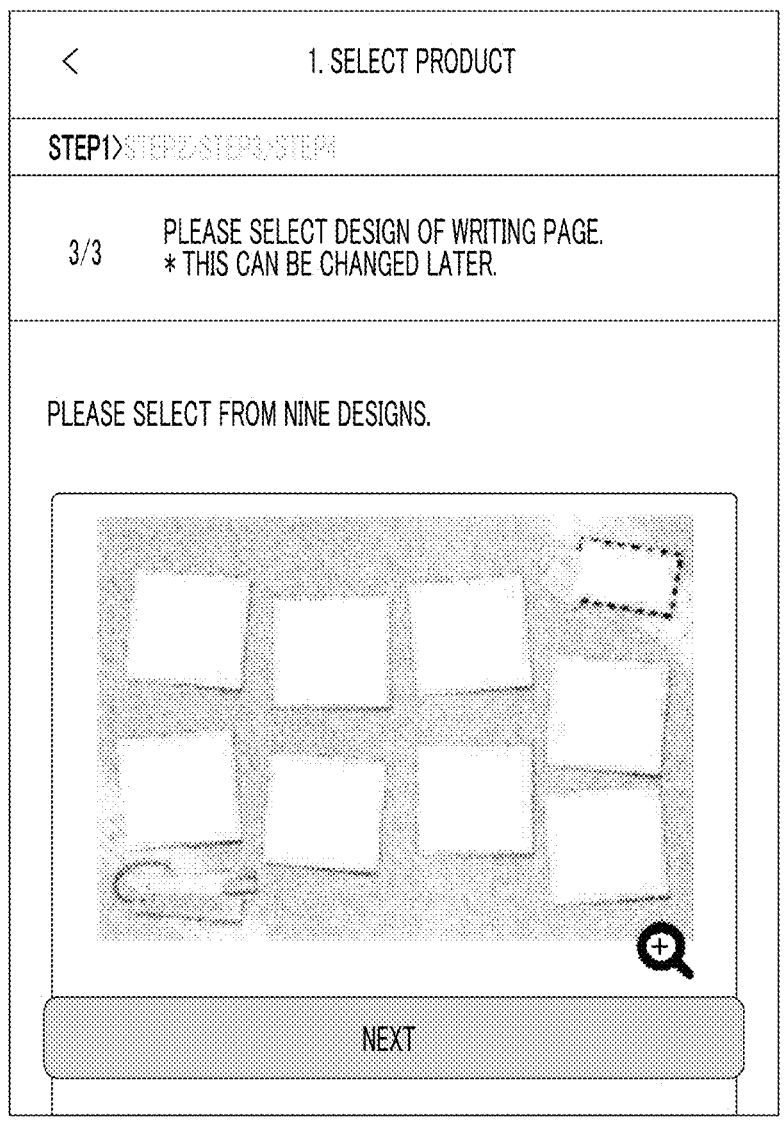
FIG. 14 is a conceptual diagram of an example showing a screen for setting the design of the writing page of a photobook.

Then, as shown in FIG. 14, a screen for setting the design of the writing page of the photobook is displayed on the image display unit 68 of the terminal device 14 of the secretary user by the writing design setting section 34.

On the screen for setting the design of the writing page, the secretary user selects and sets one writing design among one or more writing designs, in the example shown in FIG. 14, nine writing designs, through the instruction input unit 70.

After the design of the writing page is set, in a case where the "Next" button is pressed, the information of the design of the writing page set by the secretary user is acquired from the terminal device 14 of the secretary user by the writing design setting section 34 (step S5).

Figure 15:
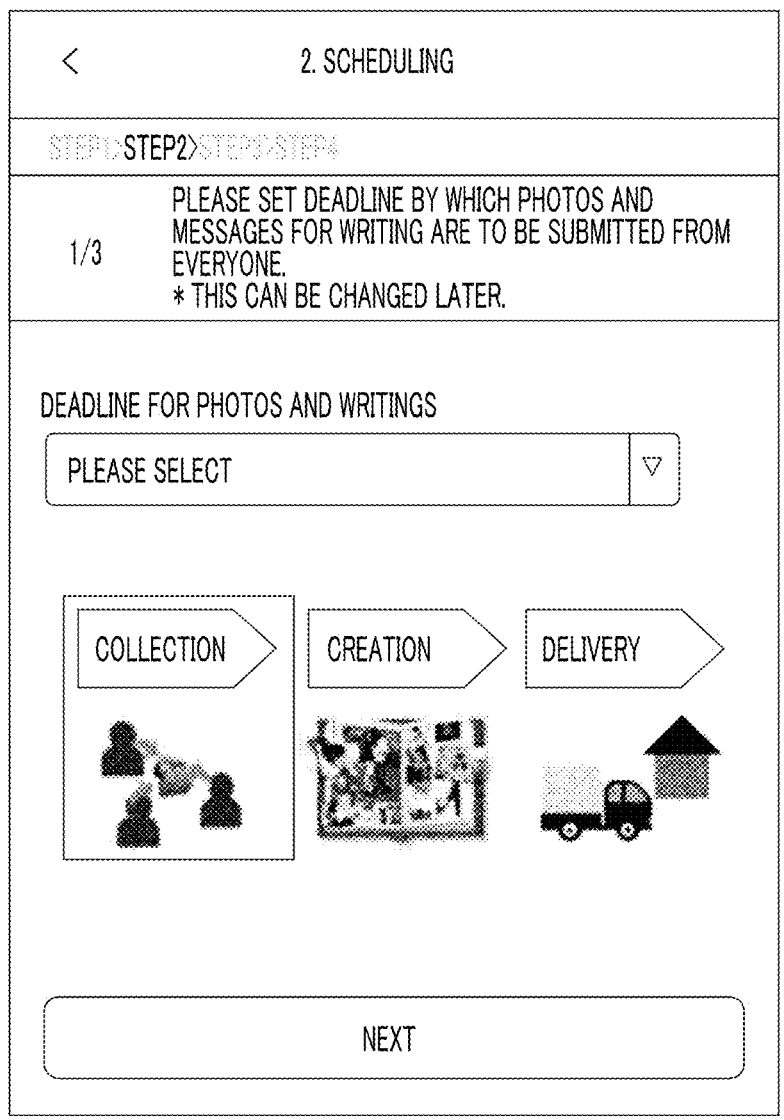
FIG. 15 is a conceptual diagram of an example showing a screen for setting the deadline for images and messages for writing.

Then, as shown in FIG. 15, a screen for setting the deadline for images and messages for writing is displayed on the image display unit 68 of the terminal device 14 of the secretary user by the schedule setting section 36.

The secretary user sets the deadline for images and messages for writing, through the instruction input unit 70, on the screen for setting the deadline for images and messages for writing. In the example shown in FIG. 15, a list of dates within a predetermined period from the current date is registered in advance by the pull-down menu. The secretary user selects and sets one date, for example, December 2, as the deadline, from the list of dates registered in the pull-down menu.

After the deadline for images and messages for writing is set, in a case where the "Next" button is pressed, the information of the deadline for images and messages for writing set by the secretary user is acquired from the terminal device 14 of the secretary user by the schedule setting section 36 (step S6).

Figure 16:
FIG. 16 is a conceptual diagram of an example showing a screen for setting a composite image creation period.

Then, as shown in FIG. 16, a screen for setting a composite image creation period is displayed on the image display unit 68 of the terminal device 14 of the secretary user by the schedule setting section 36.

The secretary user sets a composite image creation period, through the instruction input unit 70, on the screen for setting the composite image creation period. In the example shown in FIG. 16, a list of dates within 30 days from the deadline for the period of images and messages for writing is registered in advance by the pull-down menu. The secretary user sets December 2 to 4 as a creation period by selecting one date, for example, December 4 from the list of dates registered in the pull-down menu.

After the composite image creation period is set, in a case where the "Next" button is pressed, the information of the composite image creation period set by the secretary user is acquired from the terminal device 14 of the secretary user by the schedule setting section 36 (step S6).

Figure 17:
FIG. 17 is a conceptual diagram of an example showing a screen for setting the image product delivery date.

Then, as shown in FIG. 17, a screen for setting the image product delivery date is displayed on the image display unit 68 of the terminal device 14 of the secretary user by the schedule setting section 36.

The image product delivery date is automatically set to a date after a predetermined period from the deadline of the composite image creation period, in the example shown in FIG. 17, December 20 after 16 days from December 4 that is the last day of the composite image creation period, by the schedule setting section 36.

The secretary user can change the image product delivery date, through the instruction input unit 70, on the screen for setting the image product delivery date. In the example shown in FIG. 17, it is possible to set the image product delivery date to a date before December 20, for example, by paying an extra fee and specifying the express finish.

After the image product delivery date is set, in a case where the "Next" button is pressed, the information of the image product delivery date is acquired by the schedule setting section 36 (step S6).

In the case of creating a composite image using a plurality of images transmitted from the terminal devices 14 of the plurality of users, it is difficult to manage the time limit. In the image processing apparatus 10, however, since it is possible to manage the time limit, the burden on the secretary user can be reduced.

Figure 18:
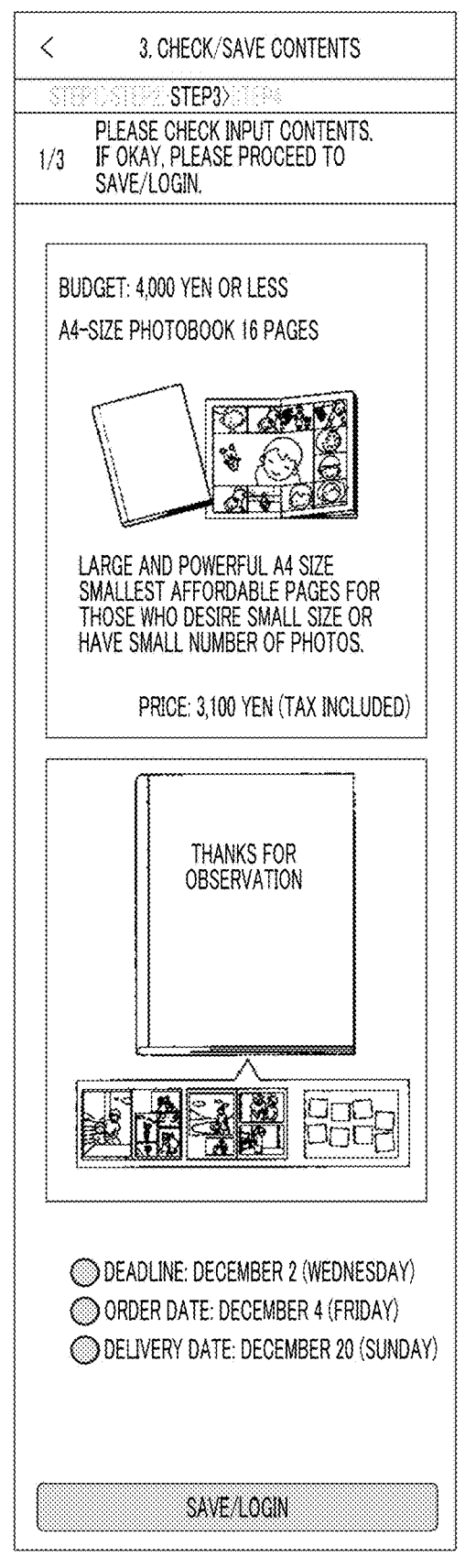

Then, as shown in FIG. 18, a screen for checking the information of the image product item and the schedule is displayed on the image display unit 68 of the terminal device 14 of the secretary user by the setting storage section 38.

On the screen for checking the information of the image product item and the schedule, the secretary user checks the information of the image product item and the schedule. In a case where the setting is acceptable, a "Save/login" button is pressed to proceed to the next screen. In a case where it is necessary to change the setting, the "<" button is pressed to return to the previous screen.

In a case where the "Save/login" button is pressed, as shown in FIG. 19, a screen for the secretary user to input account information for logging in to the image processing apparatus 10 is displayed on the image display unit 68 of the terminal device 14 of the secretary user by the setting storage section 38.

The secretary user inputs the e-mail address of the secretary user and the secretary password, as account information for logging in to the image processing apparatus 10, through the instruction input unit 70. In a case where the secretary user has already completed membership registration to the image processing apparatus 10, a "Login" button is pressed. In a case where the secretary user has forgotten the secretary password after membership registration, processing for recovering the secretary password is performed by pressing a "Password forgot" button.

In a case where the "Login" button is pressed, the account information already stored is compared with the account information input by the secretary user by the account information storage section 40. In a case where the account information already stored matches the account information input by the secretary user, the secretary user can log in to the image processing apparatus 10.

On the other hand, in a case where membership registration has not yet been completed, processing for new membership registration is performed by pressing a "New membership registration" button. In a case where the "New membership registration" button is pressed, the e-mail address and the secretary password input by the secretary user are acquired and are stored as the account information of the secretary user by the account information storage section 40. After the membership registration is completed, the terminal device 14 of the secretary user can log in to the image processing apparatus 10.

Then, the information of the image product item acquired by the product item acquisition section 30 and the schedule acquired by the schedule setting section 36 is stored by the setting storage section 38.

Then, as shown in FIG. 20, a screen showing that the login of the secretary user and the storage of the information of the image product item and the schedule have been completed is displayed on the image display unit 68 of the terminal device 14 of the secretary user by the setting storage section 38.

Then, a message including the URL for accessing the management screen is transmitted by the management screen information transmission section 42. The message includes a notice indicating that the information of the image product item and the schedule has been stored.

In the example shown in FIG. 20, a message including the URL for accessing the management screen can be transmitted not only to the e-mail address of the secretary user but also to the e-mail address of participating users other than the secretary user, for example, the e-mail address of a deputy secretary user who acts as a secretary user, by inputting the e-mail address of participating users other than the secretary user through the instruction input unit 70.

Then, in a case where the "Next" button is pressed, as shown in FIG. 21, a screen for creating an invitation letter to be sent to the terminal device 14 of the participating user is displayed on the image display unit 68 of the terminal device 14 of the secretary user by the upload prompting section 44.

On the screen for creating an invitation letter, the secretary user inputs a message included in the invitation letter within a predetermined number of characters, in the example shown in FIG. 21, 150 characters, through the instruction input unit 70. In the example shown in FIG. 27, an initial message "Let's make a photobook with your photos and messages!" is automatically input. Therefore, it is possible to save the time and effort for the secretary user to input a message. The secretary user may use the initial message as it is, or may input other messages.

In a case where the "Next" button is pressed, the information of a message included in the invitation letter is acquired by the upload prompting section 44, so that the invitation letter is created (step S7).

Then, as shown in FIG. 22, a screen for checking the contents of the invitation letter is displayed on the image display unit 68 of the terminal device 14 of the secretary user by the upload prompting section 44.

On the screen for checking the contents of the invitation letter, the secretary user checks the contents of the invitation letter. In a case where the contents are acceptable, a "To invitation letter send screen" button is pressed to proceed to the next screen. In a case where it is necessary to change the contents, the "<" button is pressed to return to the previous screen.

In a case where the "To invitation letter send screen" button is pressed, as shown in FIG. 23, a screen for sending an invitation letter to the terminal device 14 of the participating user is displayed on the image display unit 68 of the terminal device 14 of the secretary user by the upload prompting section 44.

On the screen for sending an invitation letter, the secretary user selects, as means for sending an invitation letter, in the example shown in FIG. 23, an SNS message or e-mail, through the instruction input unit 70. The invitation letter is sent to the SNS account of the participating user as an SNS message in a case where an "SNS" button is pressed, and is transmitted to the e-mail address of the participating user by e-mail in a case where an "E-mail" button is pressed.

The secretary user may send the invitation letter to all participating users involved in the creation of a composite image, or may send the invitation letter to only some participating users.

The SNS message or the e-mail includes not only the invitation letter but also images used in a composite image, evaluation information of images, an invitation URL for accessing the screen for each participating user to upload messages for writing or the like, and a common password (in the example shown in FIG. 23, "5865").

In a case where the "Next" button is pressed, the invitation letter is sent to the terminal device 14 of each participating user by the upload prompting section 44 (step S8).

Then, the upload prompting section 44 sends an invitation letter created by the secretary user to the terminal device 14 of the secretary user. Then, after the secretary user checks the contents of the invitation letter, in a case where a transmission instruction to send the invitation letter to the terminal device 14 of a participating user other than the secretary user is acquired from the terminal device 14 of the secretary user, the invitation letter is sent to the terminal device 14 of the participating user other than the secretary user in response to the transmission instruction.

Each participating user receives the invitation letter through the terminal device 14 of the participating user, and accesses a website indicated by the invitation URL through the instruction input unit 70.

Figure 24:
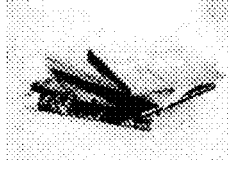
FIG. 24 is a conceptual diagram of an example showing a screen showing the received invitation letter.

In a case where the participating user accesses the website indicated by the invitation URL, as shown in FIG. 24, a screen showing the received invitation letter is displayed on the image display unit 68 of the terminal device 14 of the participating user by the upload prompting section 44 (step S9).

In the invitation letter, in addition to the message from the secretary user, uploading images and messages for writing used in the composite image and information on the deadline (in the case of the present embodiment, 23:59 on Wednesday, December 2) are displayed as a request for participating users.

Each participating user views the screen showing the invitation letter to understand that the request to the participating user from the secretary user is the upload of images and messages for writing to be made as a photobook and that the deadline is December 2.

Figure 25:
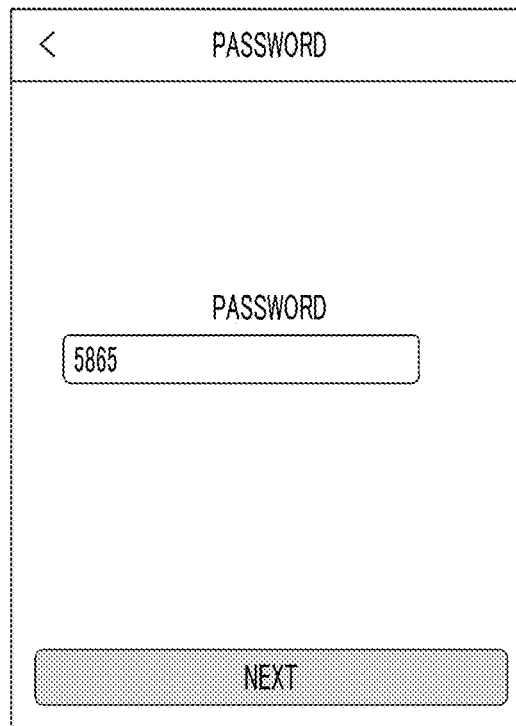

Then, in a case where a check box of "agree with terms and conditions" is checked and the "Next" button is pressed, as shown in FIG. 25, a screen for inputting a common password for accessing a screen for the participating user to upload images used in the composite image, evaluation information of images, messages for writing, and the like is displayed on the image display unit 68 of the terminal device 14 of the participating user by the account information storage section 40.

On the screen for inputting a common password, the participating user inputs the common password included in the received invitation letter (in the example shown in FIG. 25, "5865") through the instruction input unit 70.

Figure 26:
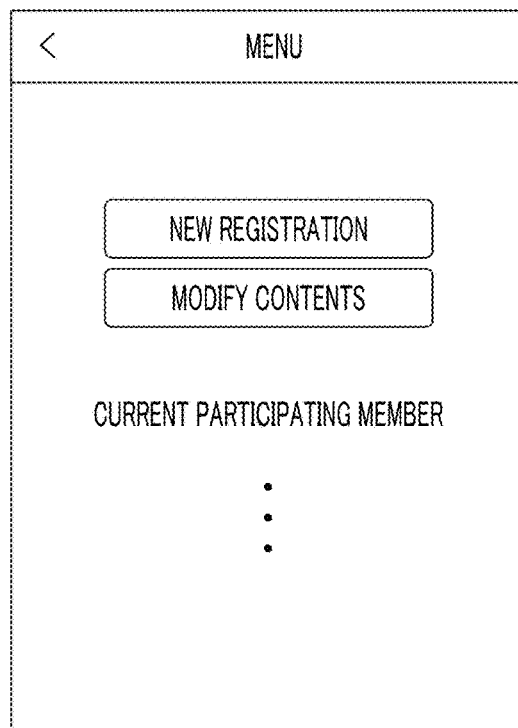
FIG. 26 is a conceptual diagram of an example showing a screen for registering a new participating user.

In a case where the common password is input and the "Next" button is pressed, as shown in FIG. 26, a screen for registering a new participating user is displayed on the image display unit 68 of the terminal device 14 of the participating user by the account information storage section 40.

On the screen for registering a new participating user, the name of a user (current participating member) who is already registered as a participating user is displayed. It is not essential to display the names of registered participating users. However, by displaying the names of registered participating users, in a case where a user registers a participating user newly, the user can register the participating user with confidence in a case where the name that the user knows is included in the names of the registered participating users.

Each participating user presses a "New registration" button in a case where the participating user has not yet been registered in the image processing apparatus 10, and presses a "Modify contents" button in a case where the participating user has already been registered in the image processing apparatus 10.

In a case where the "New registration" button is pressed, as shown in FIG. 27, a screen for registering a name and an individual password (in FIG. 27, displayed as "secret code") to be registered as a participating user is displayed on the image display unit 68 of the terminal device 14 of the participating user by the account information storage section 40.

The participating user inputs a real name or nickname as a name and inputs a certain character string as a secret code through the instruction input unit 70.

The name and the secret code of the participating user are account information of the participating user. As shown in FIG. 26, the participating user can modify images, evaluation information of images, messages for writing, and the like, which have already been uploaded, by pressing the "Modify contents" button on the screen for registering a new participating user and inputting the name and the secret code that have already been registered.

In a case where the name and the secret code of the participating user are input and the "Next" button is pressed, the name and the secret code of the participating user are acquired and are stored as the account information of the participating user by the account information storage section 40.

Then, as shown in FIG. 28, a screen for selecting an image uploaded by the participating user is displayed on the image display unit 68 of the terminal device 14 of the participating user by the image acquisition section 46.

The participating user can select an image to be uploaded by pressing an "Add image" button on the screen for selecting an image to be uploaded. The number of images selected by the participating user is displayed on the screen for selecting an image to be uploaded.

After an image to be uploaded is selected, in a case where the "Next" button is pressed, the image uploaded from the participating user, that is, the image submitted from the terminal device 14 of the participating user is acquired by the image acquisition section 46 (step S10). Thus, the image acquisition section 46 acquires a plurality of images transmitted from the terminal devices 14 of two or more participating users. Each time an image is acquired by the image acquisition section 46, the image is analyzed by the image analysis section 58, and the analysis evaluation value of the image is calculated based on the analysis result of the image by the evaluation value calculation section 60 (step S11).

Figure 29:
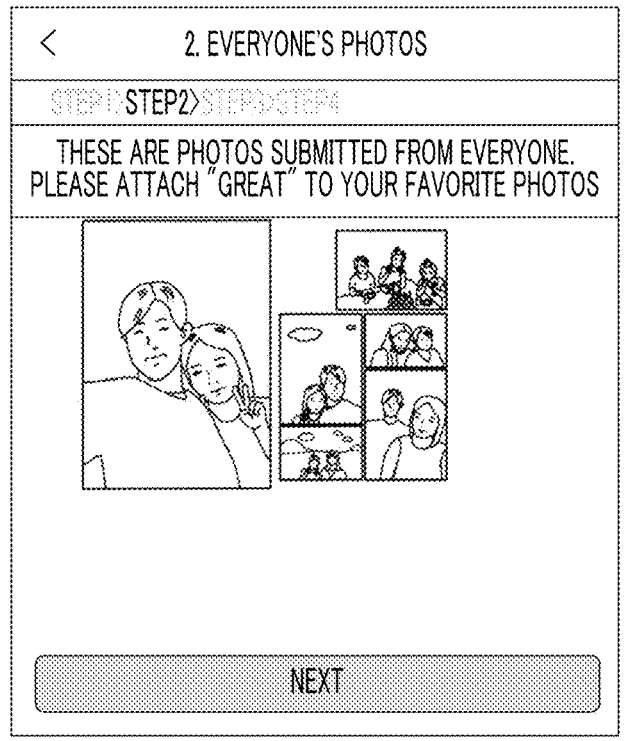
FIG. 29 is a conceptual diagram of an example showing a screen for evaluating each of a plurality of images transmitted from terminal devices of two or more participating users.

Then, as shown in FIG. 29, a screen for evaluating each of the plurality of images transmitted from the terminal devices 14 of two or more participating users is displayed on the image display unit 68 of the terminal device 14 of each participating user by the evaluation information acquisition section 48.

The participating user can give evaluation information indicating high evaluation or low evaluation to each image through the instruction input unit 70 on the screen for evaluating each image. For example, the participating user can view each image, and can give evaluation information indicating high evaluation to an image that the participating user likes by pressing a "Good" button and give evaluation information indicating low evaluation to an image that the participating user dislikes by pressing a "Not good" button.

In a case where evaluation information indicating the level of the evaluation of users is given to each image from the terminal device 14 of each participating user, the evaluation information indicating the level of the evaluation given to each image is acquired from the terminal device 14 of the participating user by the evaluation information acquisition section 48 (step S12).

Figure 30:
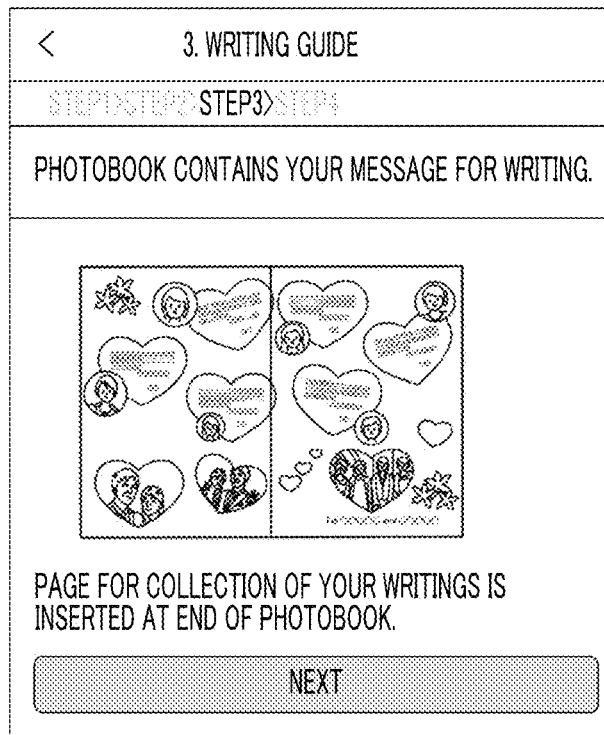
FIG. 30 is a conceptual diagram of an example showing a screen for notifying that a writing page has been inserted at the end of the photobook.

After the evaluation information is given, in a case where the "Next" button is pressed, as shown in FIG. 30, a screen notifying that a writing page has been inserted at the end of the photobook is displayed on the image display unit 68 of the terminal device 14 of the participating user by the message acquisition section 50.

The participating user views and checks the screen notifying that a writing page has been inserted at the end of the photobook.

Figure 31:
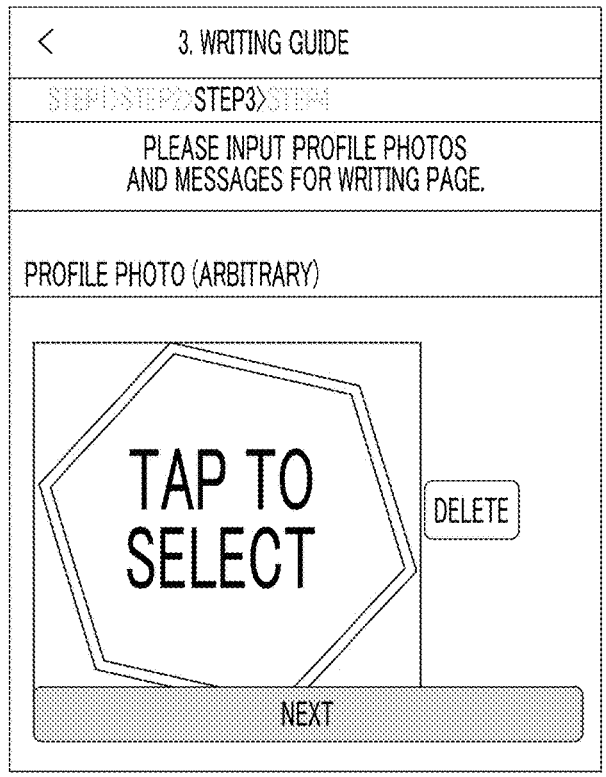
FIG. 31 is a conceptual diagram of an example showing a screen for setting a profile image of a participating user used in a writing page.

Then, in a case where the "Next" button is pressed, as shown in FIG. 31, a screen for setting the profile image of the participating user used in the writing page is displayed on the image display unit 68 of the terminal device 14 of the participating user by the message acquisition section 50.

By pressing the screen for setting a profile image, the participating user can select and set an image used as a profile image, among images owned by the participating user in the terminal device 14 of the participating user. In addition, the participating user can delete the already set profile image by pressing a "Delete" button, and can set the profile image again.

After the participating user has set the profile image, in a case where the "Next" button is pressed, the profile image set by the participating user is acquired from the terminal device 14 of the participating user by the image acquisition section 46 (step S13).

Figure 32:
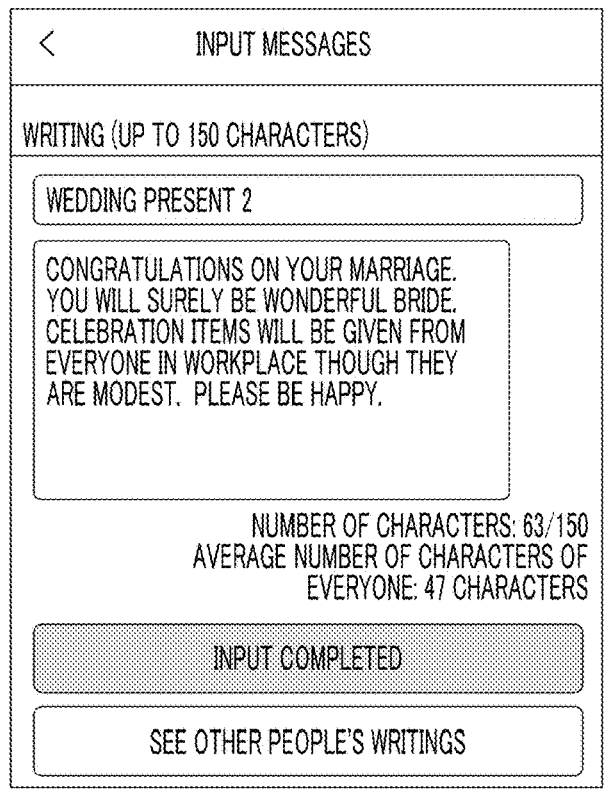
FIG. 32 is a conceptual diagram of an example showing a screen for inputting a message for writing.

Then, as shown in FIG. 32, a screen for inputting a message for writing is displayed on the image display unit 68 of the terminal device 14 of the participating user by the message acquisition section 50.

On the screen for inputting a message for writing, the participating user inputs a message included in the writing page within 150 characters through the instruction input unit 70. In the example shown in FIG. 32, an initial message "Congratulations on your marriage. . . . Please be happy" is automatically input. Therefore, it is possible to save the time and effort for the participating user to input a message. The participating user may use the initial message as it is, or may input other messages.

In addition, each participating user can view messages for writing that other participating users have already uploaded by pressing a "See other people's writings" button on the screen for inputting a message for writing.

Figure 33:
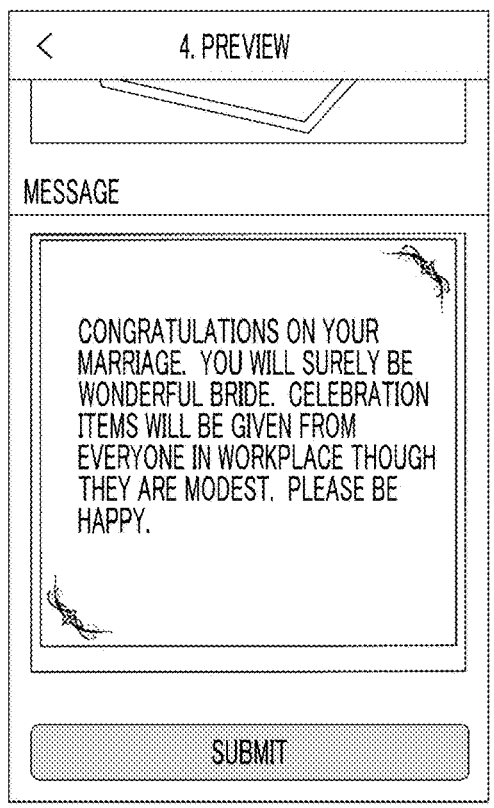
FIG. 33 is a conceptual diagram of an example showing a screen for checking the message for writing input by the participating user.

After the participating user has input the message for writing, in a case where an "Input completed" button is pressed, as shown in FIG. 33, a screen for checking the message for writing input by the participating user is displayed on the image display unit 68 of the terminal device 14 of the participating user by the message acquisition section 50.

On the screen for checking a message for writing, the participating user views and checks a message for writing. In a case where the message is acceptable, a "Submit" button is pressed to proceed to the next screen. In a case where it is necessary to change the message, the "<" button is pressed to return to the previous screen.

In a case where the "Submit" button is pressed, a message for writing submitted by the participating user, that is, a message for writing uploaded from the terminal device 14 of the participating user, is acquired by the message acquisition section 50 (step S14).

Thus, in the case of creating a composite image, such as a photobook, using images of a plurality of users, it is possible to convey the feeling of each participating user to the recipient of the photobook as a message for writing by including not only the main page but also the writing page of the photobook.

Figure 34:
FIG. 34 is a conceptual diagram of an example showing a screen showing that the uploading of the message for writing has been completed.

Then, as shown in FIG. 34, a screen showing that the message for writing has been submitted is displayed on the image display unit 68 of the terminal device 14 of the participating user.

Then, in a case where a "completed" button is pressed, the uploading of images, evaluation information of images, and messages for writing is completed.

Then, in a case where it is detected by the schedule setting section 36 that the deadline for images and messages for writing has passed, the number of images acquired by the image acquisition section 46 is calculated by the number-of-images calculation section 52 (step S15). In addition, the number of pieces of evaluation information indicating high evaluation and low evaluation that has been acquired by the evaluation information acquisition section 48 is calculated by the number-of-evaluations calculation section 54 (step S16), and the number of messages for writing acquired by the message acquisition section 50 is calculated by the number-of-messages calculation section 56 (step S17).

Then, the number-of-images evaluation section 76 evaluates whether or not the number of images calculated by the number-of-images calculation section 52 is out of the number-of-used-images range acquired by the number-of-images range acquisition section 72, and outputs number-of-images evaluation information that is the evaluation result. In the present embodiment, the evaluation target of the number-of-images evaluation section 76 is the number of images calculated by the number-of-images calculation section 52. However, in another embodiment, the number of images having analysis evaluation values equal to or greater than a predetermined threshold value may be calculated using the analysis evaluation value of the evaluation value calculation section 60 for the image acquired by the image acquisition section 46, and this may be the evaluation target of the number-of-images evaluation section 76.

According to the number-of-images evaluation information, in a case where the number of images is out of the number-of-used-images range, proposal information proposing an alternative different from the image product item acquired by the product item acquisition section 30 is transmitted to the terminal device 14 of the secretary user by the product item proposing section 74.

For example, in a case where the number of images exceeds the upper limit of the number-of-used-images range and an image product item using a larger number of images than the image product item acquired by the product item acquisition section 30 is included in one or more image product items corresponding to the information of the budget acquired by the budget setting section 28, the image product item using a larger number of images than the image product item acquired by the product item acquisition section 30 may be proposed.

In addition, in a case where the number of images exceeds the upper limit of the number-of-used-images range and an image product item having a larger number of pages than the image product item acquired by the product item acquisition section 30 is included in one or more image product items corresponding to the information of the budget acquired by the budget setting section 28, the image product item having a larger number of pages than the image product item acquired by the product item acquisition section 30 may be proposed.

By combining both, an image product item that uses a larger number of images than the image product item acquired by the product item acquisition section 30 and has a larger number of pages than the image product item acquired by the product item acquisition section 30 may be proposed.

For example, in a case where the image product item acquired by the product item acquisition section 30 is an A4 size image product item, the product item proposing section 74 may propose an A3 size image product item as an image product item using a larger number of images. In addition, in a case where the image product item acquired by the product item acquisition section 30 is an image product item configured by one sheet, such as colored paper for writing, an image product item, such as a photobook configured to include a plurality of pages, may be proposed as an image product item having a larger number of pages. In the case of an image product item configured to include 16 pages, an image product item configured to include 24 pages may be proposed as an image product item having a larger number of pages.

In this manner, by proposing an image product item using a larger number of images than the image product item acquired by the product item acquisition section 30 or an image product item having a larger number of pages than the image product item acquired by the product item acquisition section 30, it is possible to effectively use actually acquired images without wasting the actually acquired images.

On the other hand, in a case where the number of images is less than the lower limit of the number-of-used-images range and an image product item using a smaller number of images than the image product item acquired by the product item acquisition section 30 is included in one or more image product items corresponding to the information of the budget acquired by the budget setting section 28, the image product item using a smaller number of images than the image product item acquired by the product item acquisition section 30 may be proposed.

In a case where the number of images is less than the lower limit of the number-of-used-images range and an image product item having a smaller number of pages than the image product item acquired by the product item acquisition section 30 is included in one or more image product items corresponding to the information of the budget acquired by the budget setting section 28, the image product item having a smaller number of pages than the image product item acquired by the product item acquisition section 30 may be proposed.

In addition, an image product item that uses a smaller number of images than the image product item acquired by the product item acquisition section 30 and has a smaller number of pages than the image product item acquired by the product item acquisition section 30 may be proposed.

For example, in a case where the image product item acquired by the product item acquisition section 30 is an A3 size image product item, the product item proposing section 74 may propose an A4 size image product item as an image product item using a smaller number of images. In addition, in a case where the image product item acquired by the product item acquisition section 30 is an image product item, such as a photobook configured to include a plurality of pages, an image product item configured by one sheet, such as colored paper for writing, may be proposed as an image product item having a smaller number of pages. In the case of an image product item configured to include 24 pages, an image product item configured to include 16 pages may be proposed as an image product item having a smaller number of pages.

In this manner, by proposing an image product item using a smaller number of images than the image product item acquired by the product item acquisition section 30 or an image product item having a smaller number of pages than the image product item acquired by the product item acquisition section 30, it is possible to create a good-looking composite image having no empty region in the image arrangement region in the composite image.

Alternatively, in a case where the number of images is less than the lower limit of the number-of-used-images range, it may be proposed to give up the use the image product item acquired by the product item acquisition section 30. For example, in a case where the number of images is less than the lower limit of the number-of-used-images range and an image product item using a smaller number of images than the image product item acquired by the product item acquisition section 30 and an image product item having a smaller number of pages than the image product item acquired by the product item acquisition section 30 are not included in one or more image product items corresponding to the information of the budget acquired by the budget setting section 28, it may be proposed to give up the use of the image product item acquired by the product item acquisition section 30.

In a case where the number of images is less than the lower limit of the number-of-used-images range, the trimming section 78 may trim a plurality of images acquired by the image acquisition section 46 to create processed images. Then, the number-of-images calculation section 52 may calculate the total number of images by adding up the number of images acquired by the image acquisition section 46 and the number of processed images, and the product item proposing section 74 may propose an image product item according to the total number of images.

In a case where the number of images is less than the lower limit of the number-of-used-images range, the upload prompting section 44 may transmit again prompt information, which is for prompting the upload of images, to the terminal devices 14 of a plurality of participating users to acquire additional images.

For example, the image acquired by the image acquisition section 46 is set as a first image group according to the first prompt information, and then the image acquired by the image acquisition section 46 is set as a second image group according to the second prompt information.

In this case, similarly, the image acquisition section 46 may acquire the second image group uploaded from the terminal devices 14 of a plurality of participating users for a predetermined period after the second prompt information is transmitted. Then, after the predetermined period has passed, the number-of-images calculation section 52 may calculate the total number of images by adding up the number of images of the first image group and the number of images of the second image group, and the product item proposing section 74 may propose an image product item according to the total number of images.

The number of times the upload prompting section 44 transmits the prompt information is not particularly limited. For example, the upload prompting section 44 may repeatedly transmit the prompt information twice or more until the number of images exceeds the lower limit of the number-of-used-images range.

Similarly in a case where a processed image is used and a case where an additional image is used, in a case where the total number of images is less than the lower limit of the number-of-used-images range and an image product item using a smaller number of images than the image product item acquired by the product item acquisition section 30 is included in one or more image product items corresponding to the information of the budget acquired by the budget setting section 28, the image product item using a smaller number of images than the image product item acquired by the product item acquisition section 30 may be proposed.

In a case where the number of images is less than the lower limit of the number-of-used-images range and an image product item having a smaller number of pages than the image product item acquired by the product item acquisition section 30 is included in one or more image product items corresponding to the information of the budget acquired by the budget setting section 28, the image product item having a smaller number of pages than the image product item acquired by the product item acquisition section 30 may be proposed.

In addition, an image product item that uses a smaller number of images than the image product item acquired by the product item acquisition section 30 and has a smaller number of pages than the image product item acquired by the product item acquisition section 30 may be proposed, or it may be proposed to give up the use the image product item acquired by the product item acquisition section 30.

In this manner, by using at least one of the processed image or the additional image, for example, even in a case where it is not possible to create a composite image with only images acquired according to the first prompt information, a composite image can be created.

In a case where the number of images is within the number-of-used-images range, no proposal information is transmitted by the product item proposing section 74.

In a case where proposal information is received, the secretary user may select an alternative proposed by the proposal information and perform a setting again by selecting an image product item different from the image product item selected for the first time, or the use of an image product item, that is, the creation of a composite image may be given up. In a case where the number of images exceeds the upper limit of the number-of-used-images range, the secretary user can also select not to change the image product item. In this case, compositing target images are extracted from a plurality of images by an image extraction section to be described later. In another embodiment, in a case where the secretary user selects not to change the image product item, a composite image may be created by reducing images so as to fit in the original image product item.

In the image processing apparatus 10, as described above, in a case where the number of images is out of the number-of-used-images range, an alternative different from the image product item acquired by the product item acquisition section 30 is proposed according to the number of images by the product item proposing section 74 (step S18). Therefore, in the case of creating a composite image by acquiring a plurality of images from the terminal devices 14 of a plurality of participating users, it is possible to use an appropriate image product item even though the user does not know the number of images in advance.

Then, based on the evaluation information indicating the level of the evaluation of users for each image, for example, the number of pieces of evaluation information, the evaluation value calculation section 60 adds or subtracts a value to or from the analysis evaluation value of each image to calculate the overall evaluation value of each image (step S19).

As described above, it is not essential to analyze an image and calculate the analysis evaluation value each time an image is acquired. However, by analyzing an image and calculating the analysis evaluation value each time an image is acquired, it is possible to calculate the overall evaluation value of an image in a short period of time compared with a case where all images are acquired and then the images are collectively analyzed to calculate the analysis evaluation value. As a result, it is possible to shorten the time taken to create a composite image.

Then, the secretary user instructs the composite image creation unit 26 to create a composite image through the instruction input unit 70 in the terminal device 14 of the secretary user.

In a case where the composite image creation unit 26 is instructed to create a composite image, the cover creation section 62 creates a cover page which is a design corresponding to the information of the design of the cover page, on which the title set by the secretary user is written, and which has a color set by the secretary user (step S20).

Then, the main part creation section 64 creates a main page of the photobook using at least one image among the plurality of images acquired by the image acquisition section 46 (step S21).

In the main part creation section 64, the image division section divides the plurality of images acquired by the image acquisition section 46 into a plurality of groups corresponding to the number of main pages.

In a case where at least one of a processed image or an additional image is used, a plurality of images acquired by the image acquisition section 46 and at least one of the processed image or the additional image are divided into a plurality of groups corresponding to the number of main pages.

Then, for each group of images, based on the overall evaluation value of each image, the image extraction section extracts a plurality of compositing target images used in the main pages, among the images included in the group, in order from the image with the highest overall evaluation value.

Then, for each group of images, the image arrangement section determines the size of each compositing target image and the arrangement position in the main page based on the overall evaluation value of each image, and arranges the compositing target image on the corresponding main page. For example, a compositing target image with the highest overall evaluation value, among a plurality of compositing target images arranged on the main page, is arranged at the center position of the page with a size larger the other compositing target images.

Then, the writing creation section 66 creates a writing page of the design corresponding to the information of the design of the writing page by using the profile images and messages for writing of participating users (step S22).

In the writing creation section 66, the message division section divides the messages for writing acquired by the message acquisition section 50 into groups the number of which corresponds to the number of writing pages.

Then, for each group of messages for writing, for example, the message arrangement section combines messages for writing included in a group with the profile image of the corresponding participating user, and arranges a result of the combination on the writing page of a page corresponding to the group of messages for writing. Thus, a writing page is created. In each writing page, messages for writing are sequentially arranged, for example, in order in which messages for writing are uploaded.

As described above, using a plurality of images, profile images of participating users, and messages for writing that have been acquired from the terminal devices 14 of two or more participating users, a photobook including a cover page corresponding to the information of the design of the cover page, main pages, and writing pages corresponding to the information of the design of the writing pages is automatically created by the cover creation section 62, the main part creation section 64, and the writing creation section 66.

In the image processing apparatus 10, it is possible to create a composite image, such as a photobook including not only the main page but also the writing page. In addition, it is possible to create a composite image reflecting not only the image quality but also the preferences of a plurality of participating users by determining not only images used in the main page but also the size of each image and the arrangement position in the main page based on the overall evaluation value of each image.

The secretary user views each page of the photobook, which includes the cover page, the main page, and the writing page that have been automatically created, in the terminal device 14 of the secretary user. The secretary user may adopt the photobook created automatically as it is, or may edit the contents of each page, for example, images used in each page, the size of each image, and the arrangement positions of images and messages for writing. In addition, it is possible to add comments, add a stamp image, and change the background type and color of each page.

The secretary user completes the creation of the photobook during the composite image creation period set by the schedule setting section 36, in the case of the present embodiment, by December 4, and orders an image product with the contents of the photobook that has been created (step S23). The image product ordered by the secretary user includes at least one of a photobook of a paper medium and a photobook of electronic data.

In a case where the image product is ordered, the photobook of the ordered image product is created and is sent to the delivery address by the delivery date of the image product set by the schedule setting section 36, in the case of the present embodiment, by December 20 (step S24). In the case of a photobook of a paper medium, for example, the photobook of a paper medium is transmitted to the delivery address. In the case of a photobook of electronic data, for example, the photobook of electronic data or an URL for downloading electronic data is transmitted to the e-mail address of the delivery address.

As described above, in the image processing apparatus 10, it is possible to create a composite image, such as a photobook including a writing page, using a plurality of images and messages for writing acquired from the terminal devices 14 of a plurality of participating users.

It is not essential for only the secretary user to create a composite image, and a plurality of users involved in the creation of a composite image may create a composite image together with each other, or at least one of a plurality of users may create a composite image.

The specific configuration of each unit of the image processing apparatus 10 is not particularly limited, and it is possible to use various configurations capable of performing the same functions.

In the embodiment described above, the server 12 includes the information setting unit 18, the information management unit 20, the data acquisition unit 22, the data analysis unit 24, and the composite image creation unit 26, at least one of these may be provided in the terminal device 14 of the user.

In the apparatus of the present invention, each component of the apparatus may be formed using dedicated hardware, or each component may be formed using a programmed computer.

The method of the present invention can be realized, for example, by a program causing a computer to execute each step of the method. In addition, it is also possible to provide a computer-readable recording medium in which the program is recorded.

While the present invention has been described in detail, the present invention is not limited to the above-described embodiment, and various improvements and modifications may be made without departing from the scope and spirit of the present invention.

EXPLANATION OF REFERENCES

10: image processing apparatus
12: server
14: terminal device (client)
16: network
18: information setting unit
20: information management unit
22: data acquisition unit
24: data analysis unit
26: composite image creation unit
28: budget setting section
30: product item acquisition section
32: cover design setting section
34: writing design setting section
36: schedule setting section
38: setting storage section
40: account information storage section
42: management screen information transmission section
44: upload prompting section
46: image acquisition section
48: evaluation information acquisition section
50: message acquisition section
52: number-of-images calculation section
54: number-of-evaluations calculation section
56: number-of-messages calculation section
58: image analysis section
60: evaluation value calculation section
62: cover creation section
64: main part creation section
66: writing creation section
68: image display unit
70: instruction input unit
72: number-of-images range acquisition section
74: product item proposing section
76: number-of-images evaluation section
78: trimming section

What is claimed is:

1. An image processing apparatus, comprising:
a processor configured to
  acquire a setting of a first image product item from among multiple types of image product items set by a first user of a plurality of users, from a terminal device of the first user through a network;
  acquire a range of numbers of images to be used in the first image product item;
  transmit first prompt information prompting upload of the images to terminal devices of the plurality of users through the network, wherein the first prompt information includes information prompting the plurality of users to upload images;
  acquire a first image group, which is uploaded from the terminal devices of the plurality of users, through the network for a first predetermined period after the first prompt information is transmitted;
  perform image analysis and calculate an analysis evaluation value of each image of the first image group;
  calculate a number of images having analysis evaluation values equal to or greater than a predetermined threshold value in the first image group after the first predetermined period has passed; and
  transmit proposal information, which is for proposing an alternative image product different from the first image product item, to the terminal device of the first user through the network according to the number of images in the first image group in a case where the number of images in the first image group is out of the range of numbers of images to be used in the first image product item, wherein
the proposal information includes information of the image product which is different type from the first image product,
in a case where the number of images in the first image group having analysis evaluation values equal to or greater than a predetermined threshold value is less than the lower limit, the processor is configured to
transmit second prompt information prompting upload of the images to the terminal devices of the plurality of users,
acquire a second image group, which is uploaded from the terminal devices of the plurality of users, for a second predetermined period after the second prompt information is transmitted,
perform image analysis and calculate the analysis evaluation value of each image of the second image group; and
calculate the second total number of images having analysis evaluation values equal to or greater than a predetermined threshold value by adding up the number of images in the first image group and the number of images in the second image group after the second predetermined period has passed, and in a case where the second total number of images is less than the lower limit and an image product item using a smaller number of images than the first image product item is included in the one or more image product items, the processor is configured to transmit proposal information, which is for proposing the image product item using a smaller number of images than the first image product item, as the different alternative.

2. The image processing apparatus according to claim 1, wherein,
in a case where the number of images in the first image group exceeds an upper limit of the range of numbers of images to be used in the first image product item and an image product item using a larger number of images than the first image product item is included in the one or more image product items, the processor transmits proposal information, which is for proposing the image product item using a larger number of images than the first image product item, as the different alternative.

3. The image processing apparatus according to claim 1, wherein,
in a case where the number of images in the first image group exceeds an upper limit of the range of numbers of images to be used in the first image product item and an image product item having a larger number of pages than the first image product item is included in the one or more image product items, the processor transmits proposal information, which is for proposing the image product item having a larger number of pages than the first image product item, as the different alternative.

4. The image processing apparatus according to claim 1, wherein,
in a case where the number of images in the first image group is less than a lower limit of the range of numbers of images to be used in the first image product item and an image product item using a smaller number of images than the first image product item is included in the one or more image product items, the processor transmits proposal information, which is for proposing the image product item using a smaller number of images than the first image product item, as the different alternative.

5. The image processing apparatus according to claim 1, wherein,
in a case where the number of images in the first image group is less than a lower limit of the range of numbers of images to be used in the first image product item and an image product item having a smaller number of pages than the first image product item is included in the one or more image product items, the processor transmits proposal information, which is for proposing the image product item having a smaller number of pages than the first image product item, as the different alternative.

6. The image processing apparatus according to claim 1, wherein,
in a case where the number of images in the first image group is less than a lower limit of the range of numbers of images to be used in the first image product item, the processor transmits proposal information, which is for proposing giving up use of the first image product item, as the different alternative.

7. The image processing apparatus according to claim 1, the processor further configured to:
trim the first image group to create a processed image in a case where the number of images in the first image group is less than a lower limit of the range of numbers of images to be used in the first image product item, wherein
the processor calculates the first total number of images by adding up the number of images in the first image group and the number of processed images after the first predetermined period has passed, and
in a case where the first total number of images is less than the lower limit and an image product item using a smaller number of images than the first image product item is included in the one or more image product items, the processor transmits proposal information, which is for proposing the image product item using a smaller number of images than the first image product item, as the different alternative.

8. The image processing apparatus according to claim 1, the processor further configured to:
trim the first image group to create a processed image in a case where the number of images in the first image group is less than a lower limit of the range of numbers of images to be used in the first image product item, wherein
the processor calculates the first total number of images by adding up the number of images in the first image group and the number of processed images after the first predetermined period has passed, and
in a case where the first total number of images is less than the lower limit and an image product item having a smaller number of pages than the first image product item is included in the one or more image product items, the processor transmits proposal information, which is for proposing the image product item having a smaller number of pages than the first image product item, as the different alternative.

9. The image processing apparatus according to claim 1, the processor further configured to:
trim the first image group to create a processed image in a case where the number of images in the first image group is less than a lower limit of the range of numbers of images to be used in the first image product item, wherein
the processor calculates the first total number of images by adding up the number of images in the first image group and the number of processed images after the first predetermined period has passed, and
in a case where the first total number of images is less than the lower limit, the processor transmits proposal information, which is for proposing giving up use of the first image product item, as the different alternative.

10. The image processing apparatus according to claim 1, wherein the processor
acquires a second image group, which is uploaded from the terminal devices of the plurality of users, for a second predetermined period after the second prompt information is transmitted,
calculates the second total number of images by adding up the number of images in the first image group and the number of images in the second image group after the second predetermined period has passed, and
in a case where the second total number of images is less than the lower limit and an image product item having a smaller number of pages than the first image product item is included in the one or more image product items, the processor transmits proposal information, which is for proposing the image product item having a smaller number of pages than the first image product item, as the different alternative.

11. The image processing apparatus according to claim 1, wherein the processor
acquires a second image group, which is uploaded from the terminal devices of the plurality of users, for a second predetermined period after the second prompt information is transmitted,
calculates the second total number of images by adding up the number of images in the first image group and the number of images in the second image group after the second predetermined period has passed, and
in a case where the second total number of images is less than the lower limit, the processor transmits proposal information, which is for proposing giving up use of the first image product item, as the different alternative.

12. The image processing apparatus according to claim 1, wherein the processor
transmits the first prompt information to the terminal device of the first user, acquires a transmission instruction, which is for transmitting the first prompt information to terminal devices of users other than the first user, from the terminal device of the first user, and transmits the first prompt information to the terminal devices of the users other than the first user in response to the transmission instruction.

13. The image processing apparatus according to claim 1, wherein the processor
transmits the first prompt information to the terminal devices of the plurality of users by using an application for sending and receiving an e-mail or a message.

14. The image processing apparatus according to claim 1, wherein the processor
acquires the range of numbers of images to be used in the first image product item according to at least one of a size or the number of pages of the first image product item.

15. The image processing apparatus according to claim 1, wherein
the one or more image product items include a plurality of types of image product items of which at least sizes or numbers of pages are different.

16. The image processing apparatus according to claim 1, wherein
the multiple types of image product items includes at least a photobook, a shuffle print, and a calendar.

17. An image processing method performed by a processor, the image processing method comprising:
acquiring a setting of a first image product item from among multiple types of image product items, set by a first user of a plurality of users, from a terminal device of the first user through a network;
acquiring a range of numbers of images to be used in the first image product item;
transmitting first prompt information to terminal devices of the plurality of users through the network, wherein the first prompt information includes information prompting the plurality of users to upload images;
acquiring a first image group, which is uploaded from the terminal devices of the plurality of users, through the network for a first predetermined period after the first prompt information is transmitted;
performing image analysis and calculating an analysis evaluation value of each image of the first image group;
calculating a number of images having analysis evaluation values equal to or greater than a predetermined threshold value in the first image group after the first predetermined period has passed;
transmitting proposal information, which is for proposing an alternative image product different from the first image product item, to the terminal device of the first user through the network according to the number of images in the first image group in a case where the number of images in the first image group is out of the range of numbers of images to be used in the first image product item, and wherein
the proposal information includes information of the image product which is a different type from the first image product,
transmitting second prompt information, prompting upload of the images to the terminal devices of the plurality of users, in response to determining the number of images in the first image group having analysis evaluation values equal to or greater than a predetermined threshold value is less than the lower limit, and the method further comprises
acquiring a second image group, which is uploaded from the terminal devices of the plurality of users, for a second predetermined period after the second prompt information is transmitted,
performing image analysis and calculating the analysis evaluation value of each image of the second image group; and
calculating the second total number of images having analysis evaluation values equal to or greater than a predetermined threshold value by adding up the number of images in the first image group and the number of images in the second image group after the second predetermined period has passed, and
transmitting, as the different alternative, proposal information, which is for proposing the image product item using a smaller number of images than the first image product item, in response to determining the second total number of images is less than the lower limit and an image product item using a smaller number of images than the first image product item is included in the one or more image product items, proposal information.

18. A non-transitory computer-readable recording medium in which a program causing a computer to execute each step of the image processing method according to claim 17 is recorded.

* * * * *